United States Patent
Kitamura

(10) Patent No.: US 12,210,088 B2
(45) Date of Patent: Jan. 28, 2025

(54) RADAR DEVICE

(71) Applicant: DENSO CORPORATION, Kariya (JP)

(72) Inventor: Takayuki Kitamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 530 days.

(21) Appl. No.: 17/330,812

(22) Filed: May 26, 2021

(65) Prior Publication Data

US 2021/0278522 A1    Sep. 9, 2021

Related U.S. Application Data

(63) Continuation of application No. PCT/JP2019/046134, filed on Nov. 26, 2019.

(30) Foreign Application Priority Data

Nov. 28, 2018  (JP) .................. 2018-222514

(51) Int. Cl.
   *G01S 13/58*    (2006.01)
   *G01S 13/42*    (2006.01)
   *G01S 13/931*   (2020.01)

(52) U.S. Cl.
   CPC ............ *G01S 13/584* (2013.01); *G01S 13/42* (2013.01); *G01S 13/931* (2013.01)

(58) Field of Classification Search
   CPC ....... G01S 13/584; G01S 13/42; G01S 13/931
   See application file for complete search history.

(56) References Cited

U.S. PATENT DOCUMENTS 10,310,068 B2 *  6/2019  Turner .................. G01S 13/726

FOREIGN PATENT DOCUMENTS

| JP | 2013-167580 A | 8/2013 |
|----|---------------|--------|
| JP | 2015-169008 A | 9/2015 |
| JP | 2015-231090 A | 12/2015 |

* cited by examiner

*Primary Examiner* — Matthew M Barker
(74) *Attorney, Agent, or Firm* — Maschoff Brennan

(57) ABSTRACT

In a radar device, a hypothesis selector selects one of first to third hypotheses based on velocity-accuracy posterior distributions after a preset number of distribution calculations. The first hypothesis assumes that an observed velocity of an object is an aliased relative velocity when the relative velocity is higher than an upper limit of an observable velocity range. The second hypothesis assumes that the observed velocity is an unaliased relative velocity. The third hypothesis assumes that the observed velocity is an aliased relative velocity in a case where the relative velocity is below a lower limit of the observable velocity range. The velocity-accuracy posterior distributions are respectively calculated for the first to third hypotheses from velocity-accuracy prior distributions and a detection result of observed velocities for the preset number of distribution calculations.

20 Claims, 16 Drawing Sheets

FIG.12
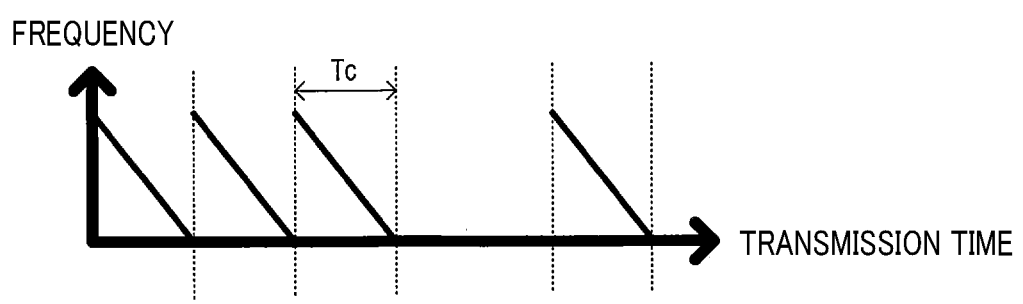
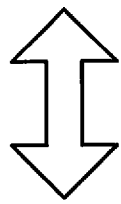
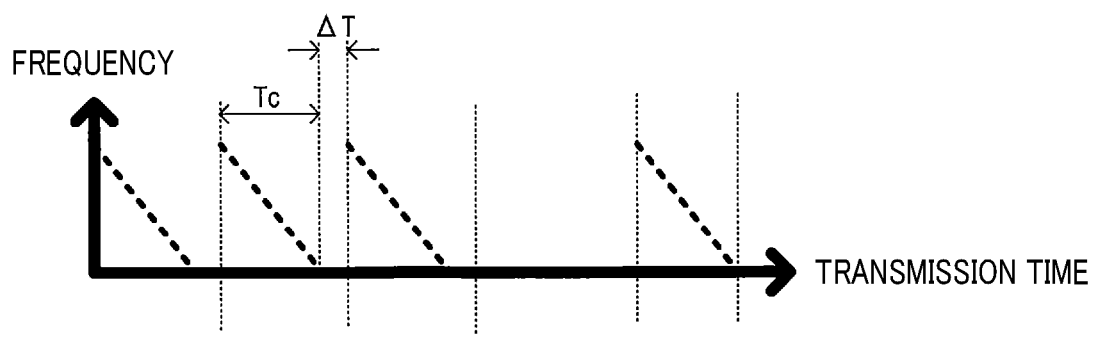

RADAR DEVICE

CROSS REFERENCE TO RELATED APPLICATION

This international application claims the benefit of priority from Japanese Patent Application No. 2018-222514 filed with the Japan Patent Office on Nov. 28, 2018, the entire contents of which are incorporated herein by reference.

BACKGROUND

Technical Field

This disclosure relates to a radar device that detects an object by transmitting radar waves and receiving their reflected waves from the object.

Related Art

A radar device is known that calculates a relative velocity (hereinafter, a target velocity) of an object by receiving reflected waves of radar waves transmitted repeatedly every preset time interval via an antenna.

BRIEF DESCRIPTION OF THE DRAWINGS

In the accompanying drawings:

FIG. 12 is an illustration of stagger modulation.

DESCRIPTION OF SPECIFIC EMBODIMENTS

Figure 1:
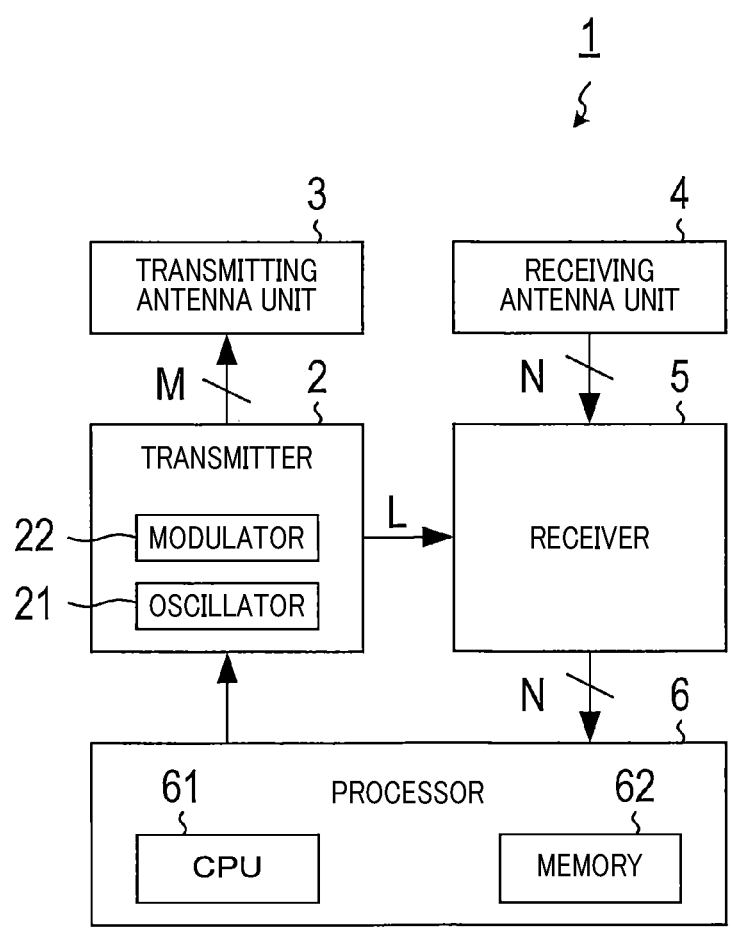
FIG. 1 is a block diagram of a radar device.

The known radar device, as disclosed in JP-A-2013-167580, transmits and receives radar waves repeated at a preset repetition period Tp. In this radar device, an observable velocity range of observed velocities ranges from $-\lambda/4 Tp$ to $+\lambda/4 Tp$, where $\lambda$ is a wavelength of the radar waves. When detecting an object that is moving at a relative velocity higher than this observable velocity range, velocity aliasing will occur. Thus, it is not possible to detect a correct target velocity.

As a countermeasure to this issue, a staggering process is commonly used to change the observable velocity range every cycle by changing the repetition period every cycle. Utilizing this staggering process needs observing changes in observed velocity for several cycles and resolving the ambiguity due to velocity-of-target aliasing. Conventionally, the ambiguity due to velocity-of-target aliasing has been resolved by simply setting a plurality of hypotheses on the target velocity for several cycles and setting the target velocity corresponding to the hypothesis for which tracking has succeeded for several cycles as a true target velocity.

However, as a result of detailed research that was performed by the present inventors, an issue was found that, in response to tracking having succeeded for several cycles despite the hypothesis being wrong, the above resolving method can not determine for which hypothesis the target velocity corresponds to the true target velocity, which leads to a decrease in detection accuracy of the velocity of the object.

In view of the foregoing, it is desired to have a technique for improving the detection accuracy of a velocity of an object.

One aspect of this disclosure provides a radar device including a transmitter, a repetition period setter, an object detector, and a hypothesis selector.

The transmitter is configured to, each time a preset measurement period corresponding to one cycle elapses, repeatedly transmit a radar wave whose frequency changes with time, every preset repetition period for a preset number of repetitions.

The repetition period setter is configured to change the repetition period each time the measurement period elapses.

The object detector is configured to receive the radar wave reflected from an object and thereby detect at least a relative velocity of a reflecting object which is the object that reflected the radar wave, as an observed velocity.

The hypothesis selector is configured to select one of a first hypothesis, a second hypothesis, and a third hypothesis, based on velocity-accuracy posterior distributions that are posterior distributions relating to accuracies of the relative velocity after a preset number of distribution calculations, one for each cycle.

The first hypothesis assumes that the observed velocity is an aliased relative velocity when the relative velocity is higher than an upper limit of an observable velocity range set based on the repetition period. The second hypothesis assumes that the observed velocity is an unaliased relative velocity. The third hypothesis assumes that the observed velocity is an aliased relative velocity in a case where the relative velocity is below a lower limit of the observable velocity range.

The velocity-accuracy posterior distributions are respectively calculated for the first hypothesis, the second hypothesis, and the third hypothesis from velocity-accuracy prior distributions that are prior distributions relating to accuracies of the relative velocity, and a detection result of the observed velocities for the preset number of distribution calculations.

The radar device configured as above is able to select the hypothesis corresponding to the posterior distribution having the highest velocity accuracy among the velocity-accuracy posterior distribution calculated based on the first hypothesis, the velocity-accuracy posterior distribution calculated based on the second hypothesis, and the velocity-accuracy posterior distribution calculated based on the third hypothesis. This allows the radar device to suppress occurrence of a situation in which the posterior distributions corresponding to at least two of the first hypothesis, the second hypothesis, and the third hypothesis simultaneously have the highest velocity accuracy. Therefore, the radar device of the present disclosure is able to suppress occurrence of a situation in which it is impossible to determine which hypothesis is correct among the first hypothesis, the second hypothesis, and the third hypothesis, and thereby improve the detection accuracy of the velocity of the object.

Hereinafter, exemplary embodiments of the present disclosure will be described in detail with reference to the accompanying drawings, in which like reference numerals refer to like or similar elements regardless of reference numerals and duplicated description thereof will be omitted.

A radar device 1 according to the present embodiment is mounted to a vehicle and configured to detect various objects around the vehicle.

As illustrated in FIG. 1, the radar device 1 includes a transmitter 2, a transmitting antenna unit 3, a receiving antenna unit 4, a receiver 5, and a processor 6.

The transmitting antenna unit 3 includes one or more antennas used for transmitting signals. The receiving antenna unit 4 includes one or more antennas used for receiving signals. At least one of the transmitting antenna unit 3 and the receiving antenna unit 4 includes a plurality of antennas.

That is, assuming that a combination of an antenna belonging to the transmitting antenna unit 3 and an antenna belonging to the receiving antenna unit 4 forms a transmitting/receiving channel, the radar device 1 is configured to have a plurality of transmitting/receiving channels. In this embodiment, it is assumed that the radar device 1 includes M antennas belonging to the transmitting antenna unit 3 and N antennas belonging to the receiving antenna unit 4, and M×N transmitting/receiving channels. M×N is an integer equal to or greater than 2. The intervals of the antennas belonging to the transmitting antenna unit 3 and the intervals of the antennas belonging to the receiving antenna unit 4 may be even intervals or uneven intervals.

Figure 2:
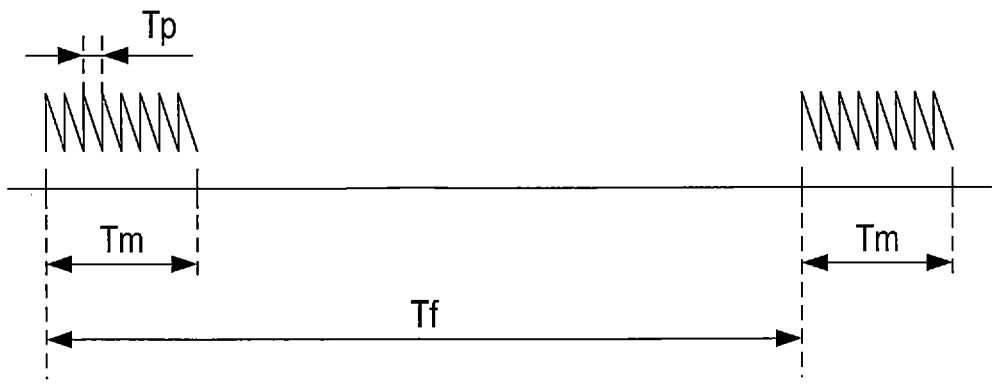
FIG. 2 is an illustration of a function of an oscillator.
Figure 3:
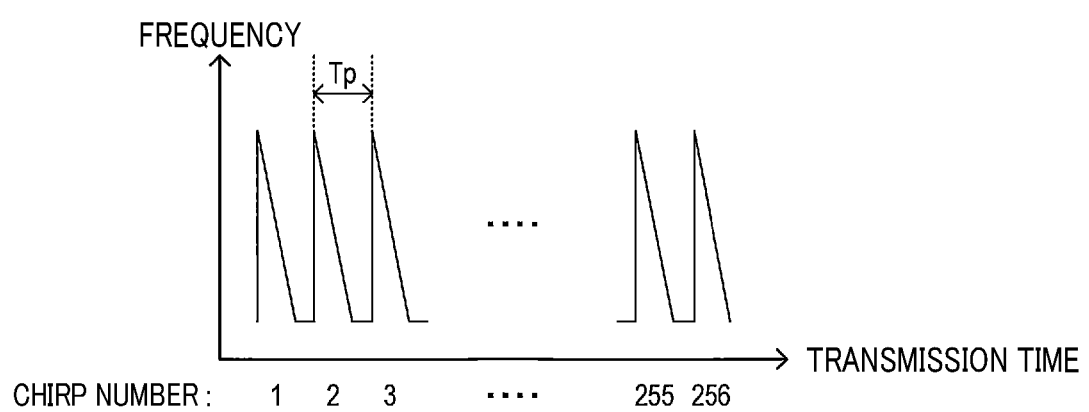
FIG. 3 is an illustration of a repetition period of chirp signals.

The transmitter 2 transmits transmission signals modulated by Fast-Chirp Modulation (FCM). The transmitter 2 includes an oscillator 21 and a modulator 22. The oscillator 21 generates a shared continuous wave signal. The oscillator 21 supplies the generated shared signal to the modulator 22 and also supplies the generated shared signal to the receiver 5 as a local signal L. The oscillator 21, as illustrated in FIG. 2, sequentially transmits a preset repetition number K (e.g., 256) of chirp signals during a measurement period Tm (e.g., 10 ms) at the beginning of each frame. A length of one frame is a measurement period Tf (e.g., 50 ms). The frequency of each chirp signal linearly changes with time. As illustrated in FIG. 3, the transmitter 2 repeatedly transmits the chirp signals every preset repetition period Tp.

The modulator 22 splits the shared signal generated by the oscillator 21 and generates M branch signals. M is equal to the number of transmitting antennas belonging to the transmitting antenna unit 3. For each of the M branch signals, the modulator 22 performs phase shift keying for changing the phase of the branch signal every repetition period Tp, whereby the modulator 22 generates M transmission signals to be supplied to each of the transmitting antennas belonging to the transmitting antenna unit 3. In the phase shift keying, the modulator 22 sets a different amount of phase rotation $\Delta\varphi$ for each of the M branch signals, and rotates the branch signal phase by the amount of phase rotation $\Delta\varphi$ every repetition period Tp.

Figure 4:
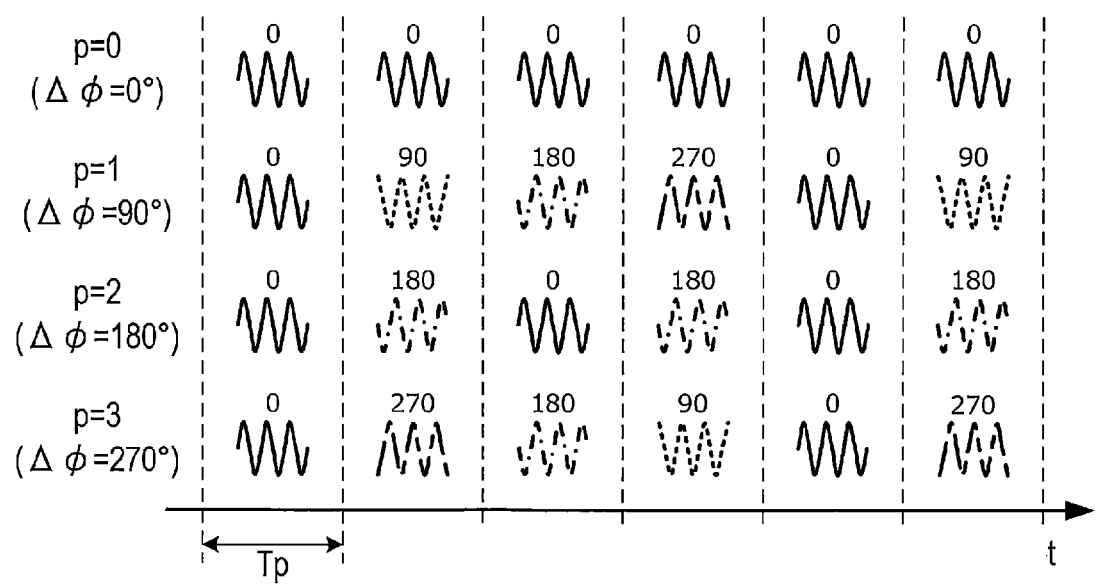
FIG. 4 is an example of amounts of phase rotation used for phase shift keying in a modulator.

Here, let P be the number of phases used for phase shift keying. P is a positive integer greater than M. The modulator 22 uses P types of amounts of phase rotation expressed by $\Delta\varphi = p \times 360°/P$, where $p = 0, 1, 2, \ldots, P-1$. For example, in the case of P=4, $\Delta\varphi = 0°$ when p=0, as illustrated in FIG. 4. In this case, a phase difference between each of the transmission signals to be transmitted every repetition period Tp after modulation and the branch signal (that is, the shared signal) that is the signal before modulation is zero. When p=1, $\Delta\varphi = 90°$ (90 degrees), in which case the phase difference of the transmission signal from the shared signal changes every repetition period Tp in the following order: 0°→90°→180°→270°→0° (and so forth). When p=2, $\Delta\varphi = 180°$, in which case the phase difference of the transmission signal from the shared signal changes every repetition period Tp in the following order: 0°→180°→0°→180°→0° (and so forth). When p=3, $\Delta\varphi = 270°$, in which case the phase difference of the transmission signal from the shared signal changes every repetition period Tp in the following order: 0°→270°→180°→90°→0° (and so forth).

Since P>M is set as described above, not all, but some of the P types of amounts of phase rotation $\Delta\varphi$ are used for phase shift keying.

The modulator 22 is configured to appropriately change the settings of the number of phases P, selection of M types of amounts of phase rotation to be used for phase shift keying from the P types of amounts of phase rotation $\Delta\varphi$, and a correspondence between the selected M types of amounts of phase rotation and the M transmitting antennas. Changes in the settings may be made according to instructions from the processing unit 6 or may be automatically made. Automatic changes in the settings may be made according to a predefined pattern or may be performed randomly.

As illustrated shown in FIG. 1, the receiver 5 generates, for each of the N received signals output from the respective receiving antennas belonging to the receiving antenna unit 4, a beat signal that is a difference signal between the received signal and the local signal L. The receiver 5 further samples and supplies the generated beat signals to the processor 6.

The processor 6 is an electronic control unit (ECU) configured around at least one microcomputer formed of a central processing unit (CPU) 61 and a memory 62. The memory includes, for example, a read-only memory (ROM) and a random-access memory (RAM). Various functions of the microcomputer may be implemented by the CPU 61 executing a program stored in a non-transitory tangible storage medium. In this example, the memory 62 corresponds to the non-transitory tangible storage medium storing the program. Further, a method corresponding to the program is implemented by execution of the program. Some or all of the functions implemented by the CPU 61 may be hardware-implemented using a single or a plurality of integrated circuits (ICs) or the like. The at least one microcomputer forming the processor 6 may include a single or a plurality of microcomputers.

Process steps of an object detection process to be performed by the processor 6 will now be described. The object detection process is repeatedly performed after activation of the processor 6.

Figure 5:
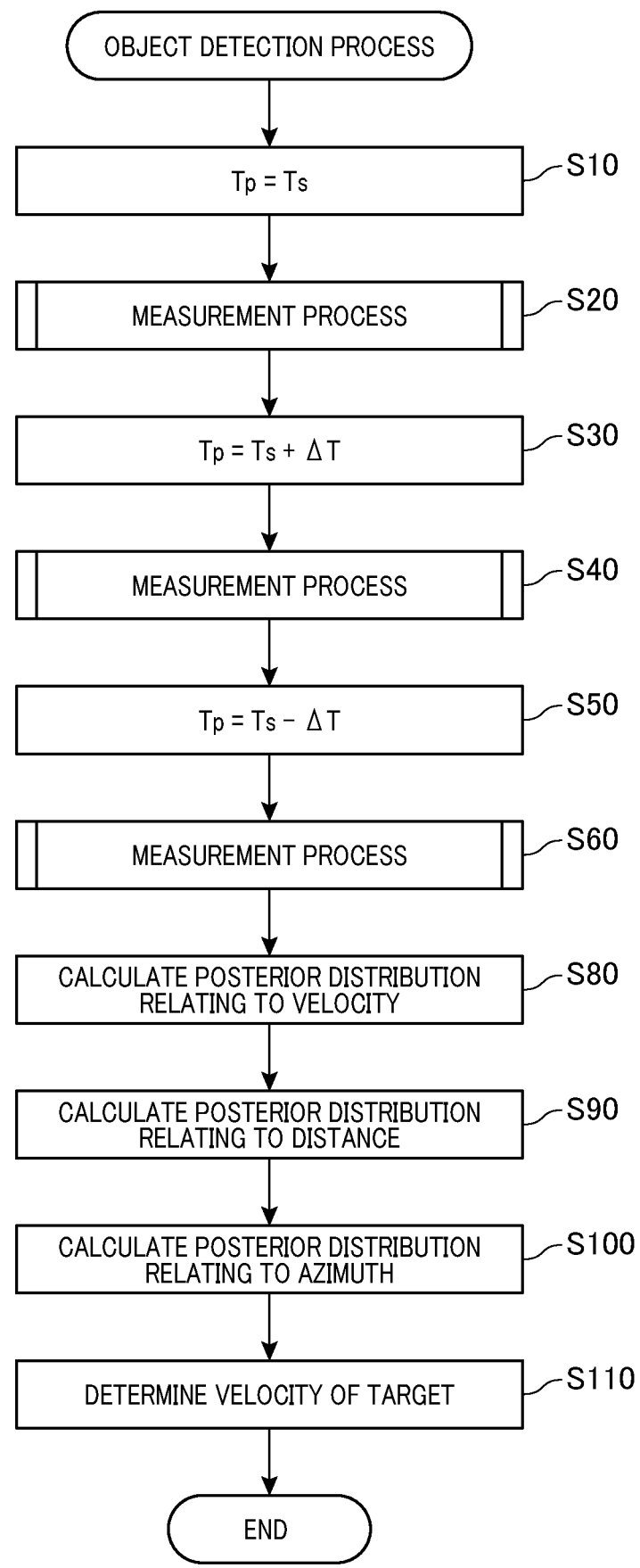
FIG. 5 is a flowchart of an object detection process.

Upon the object detection process being performed, the processor 6, as illustrated in FIG. 5, sets the repetition period Tp that is a parameter relating to the shared signal generated by the oscillator 21, to a preset reference Tc (e.g., 60 μs) in S10.

The processor 6 performs a measurement process at S20. Process steps of the measurement process will now be described.

Figure 6:
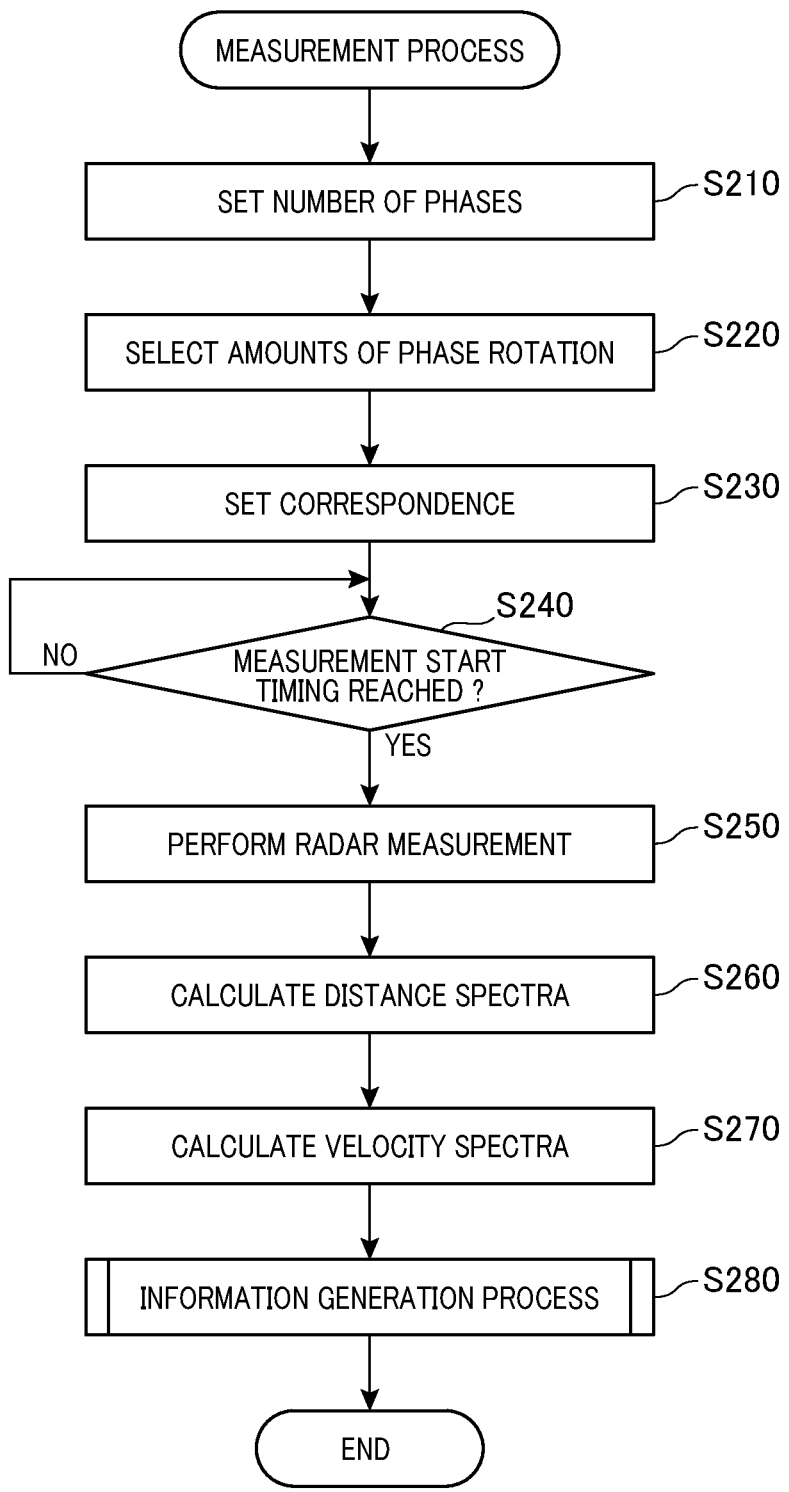
FIG. 6 is a flowchart of a measurement process.

Upon the measurement process being performed, the processor 6, as illustrated in FIG. 6, sets the number of phases P used for phase shift keying in the modulator 22 at S210. The number of phases P is set greater than the number of transmitting antennas M. For example, the number of phases P may be set such that P=M+1. The number of phases P may be a fixed value or may be selected from plural types of values according to a predefined pattern or randomly each time this process is performed.

At S220, the processor 6 selects M types of amounts of phase rotation used for phase shift keying in modulator 22 from P types of amounts of phase rotation determined by the number of phases P. The M types of amounts of phase rotation are selected such that, for each type, amounts of phase rotation are not evenly distributed within 360 degrees, that is, amounts of phase rotation are non-uniformly distributed within 360 degrees.

More specifically, if P and M do not have any common divisors, any types of amounts of phase rotation may be selected. If P and M have at least one common divisor, it is necessary to carefully select M types of amounts of phase rotation such that their intervals are not repeated in the same pattern.

Figure 7:
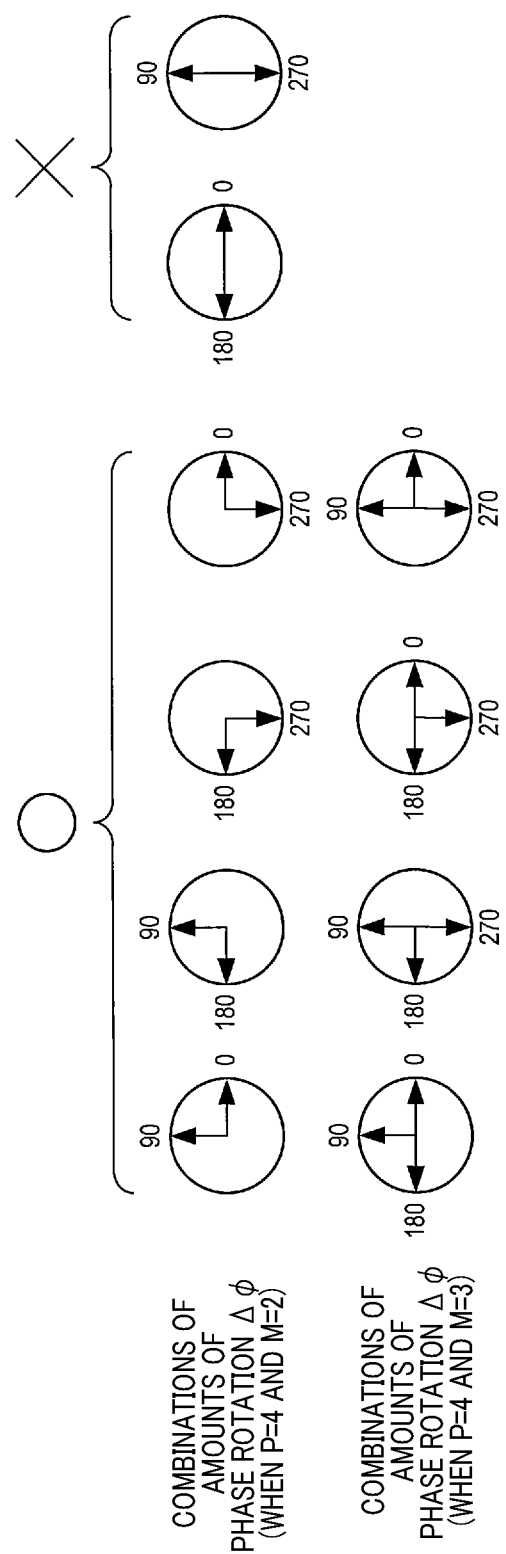
FIG. 7 is an example of selectable and unelectable combinations of amounts of phase rotation.

For example, as illustrated in FIG. 7, when P=4 and M=2, (0°, 90°), (90°, 180°), (180°, 270°), and (270°, 0°) can be selected as combinations of amounts of phase rotation, but the other combinations of amounts of phase rotation, that is, (0°, 180°) and (90°, 270°), can not be selected. When P=4 and M=3, all of (0°, 90°, 180°), (90°, 180°, 270°), (180°, 270°, 0°) and (270°, 0°, 90°) can be selected as combinations of amounts of phase rotation. However, in the present embodiment, the combinations of amounts of phase rotation including $\Delta\varphi=0°$ are always selected.

The selection of the amounts of phase rotation may always be constant or may be changed according to a predefined pattern or randomly among the selectable combinations each time the object detection process is performed.

As illustrated in FIG. 6, upon completion of S220, the processor 6 sets a correspondence between the M types of amounts of phase rotation selected at S220 and the M transmitting antennas at S230. This association may be performed according to a predefined rule or randomly. In addition, this correspondence may always be constant or may be changed according to a predefined pattern or randomly each time the object detection process is performed.

Figure 8:
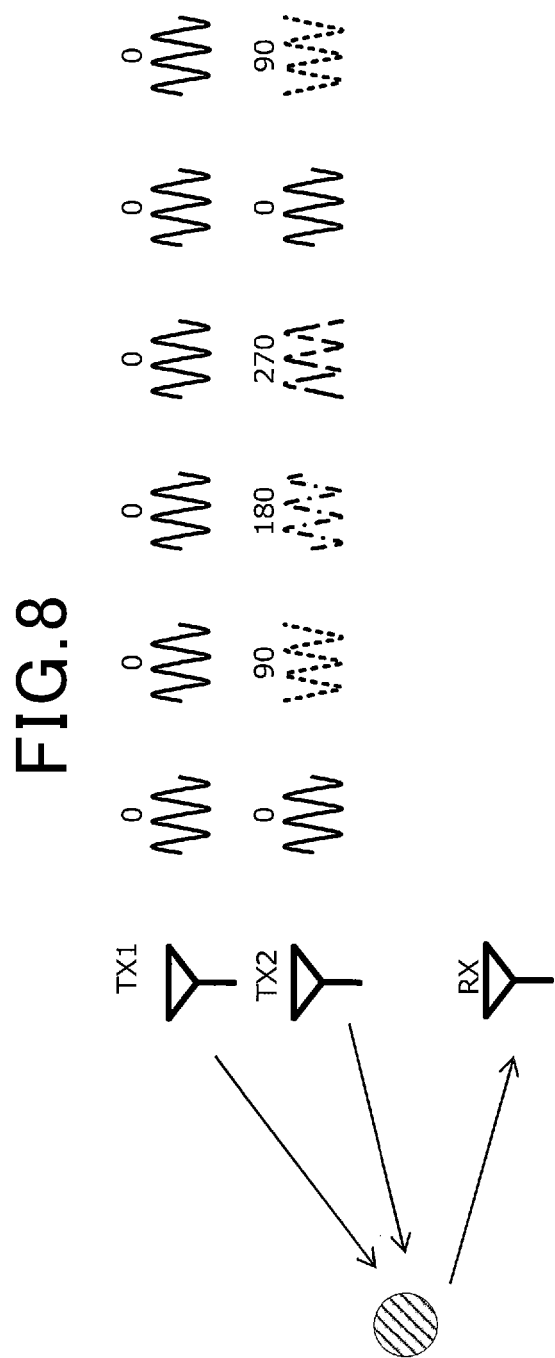
FIG. 8 is an example of selection of amounts of phase rotation.

FIG. 8 illustrates an example case where P=4 and M=2 and (0°, 90°) is selected as a combination of amounts of phase rotation. $\Delta\varphi=0°$ is assigned to the transmitting antenna TX1 and $\Delta\varphi=90°$ is assigned to the transmitting antenna TX2. FIG. 8 illustrates changes in phase of a transmission signal supplied to each of the transmitting antennas TX1 and TX2.

As illustrated in FIG. 6, upon completion of S230, the processor 6, at S240, determines whether the measurement start timing is reached. If the measurement start timing is not reached, then the processor 6 repeats S240 and waits until the measurement start timing is reached. If the measurement start timing is reached, the processor 6 proceeds to S250.

The measurement start timing is a timing at which a frame having a length determined by the measurement period Tf changes.

Upon proceeding to S250, the processor 6 actuates the transmitter 2 according to a setting result to perform radar measurement. More specifically, the processor 6 causes the transmitter 2 to repeatedly transmit the chirp signals every repetition period Tp during the measurement period Tm and acquires a result of sampling of the beat signals generated from the received signals.

At S260, the processor 6 performs, for each chirp signal, frequency analysis of the result of sampling of the beat signals acquired from each of the N receiving antennas, thereby calculating K distance spectra for each of the N receiving antennas. In each distance spectrum, a peak will appear at a frequency corresponding to the time it takes for the emitted waves from the transmitting antennas to travel to the object that reflected the emitted waves (that is, a distance to the object).

At S270, the processor 6 calculates a velocity spectrum for each of the N receiving antennas using the N×K distance spectra calculated at S260. More specifically, for each of the N receiving antennas, the signals of the same frequency bin are extracted from the K distance spectra associated with the receiving antenna, and the frequency analysis process in the time axis direction is performed for the extracted signals. This frequency analysis process is performed for all frequency bins (i.e., all distances).

As to the velocity spectra, when the relative velocity to the object that reflected the emitted waves from the transmitting antenna unit 3 is zero, frequencies corresponding to the amounts of phase rotation assigned to the respective transmitting antennas are extracted as Doppler frequencies. That is, the frequency of a signal component corresponding to $\Delta\varphi=0°$ is 0 Hz.

Figure 9:
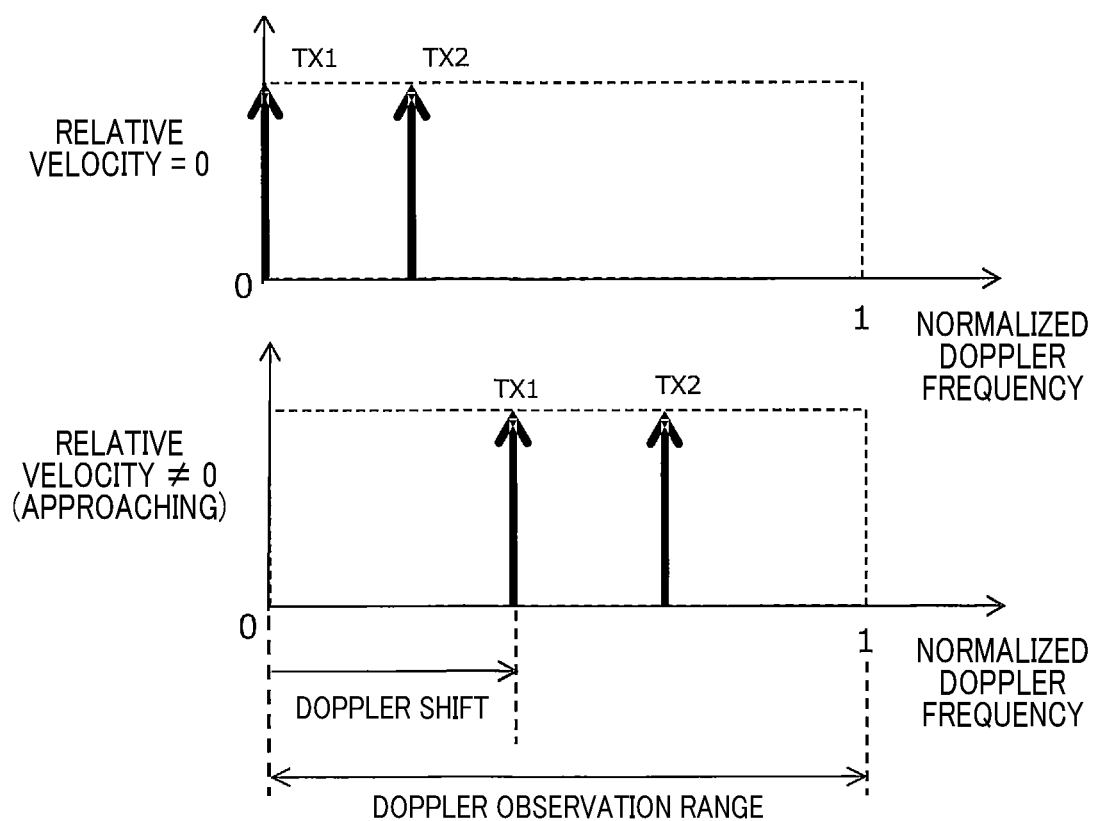
FIG. 9 is an example set of same-object peaks appearing in a velocity spectrum.

A range in which the Doppler frequencies are observed (hereinafter referred to as a Doppler observation range) is determined by the repetition period Tp. In addition, as illustrated in FIG. 9, the Doppler frequencies are detected at M positions among positions obtained by dividing the Doppler observation range into P segments. In FIG. 9, the upper-limit of the Doppler observation range is normalized to 1.

As to the velocity spectra, when there is a non-zero relative velocity to the object, the M Doppler frequencies are shifted by an amount corresponding to the relative velocity, and frequency aliasing may occur depending on the magnitude of the relative velocity.

Figure 10:
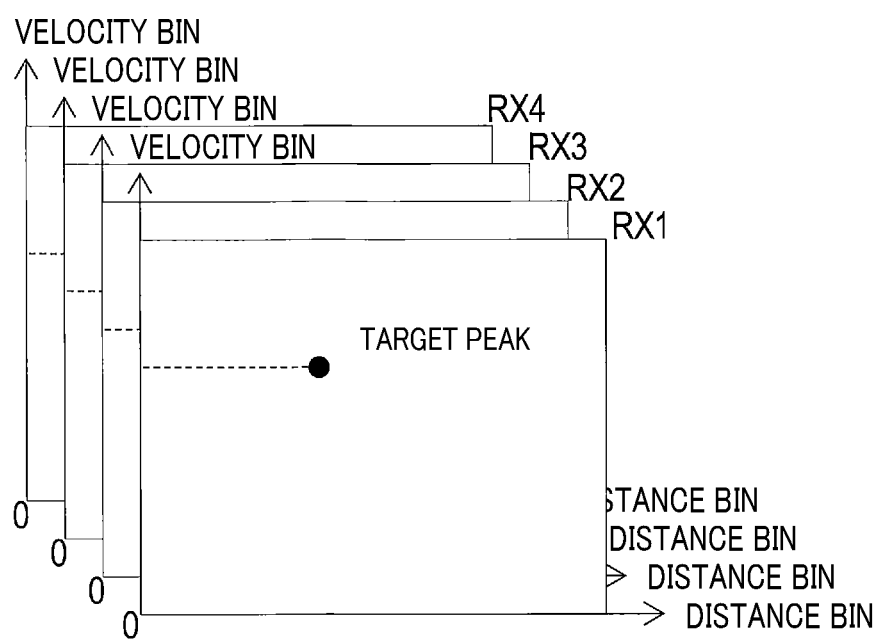
FIG. 10 is an example receive spectra.

From the calculation results acquired at S260 and S270, a 2D spectrum (hereinafter referred to as a receive spectrum) representing the distance and the relative velocity to the object that reflected the radar waves is generated for each of the receiving antennas. FIG. 10 illustrates the receive spectra when there are four receiving antennas, and a peak detected in each receive spectrum.

As illustrated in FIG. 6, upon completion of S270, the processor 6, at S280, uses the receive spectrum for each receiving antenna to calculate the distance and the relative velocity to the object that reflected the radar waves and an azimuth where the object is present. Thereafter, the processor 6 ends the measurement process.

Process steps of the information generation process performed at S280 will now be described.

Figure 11:
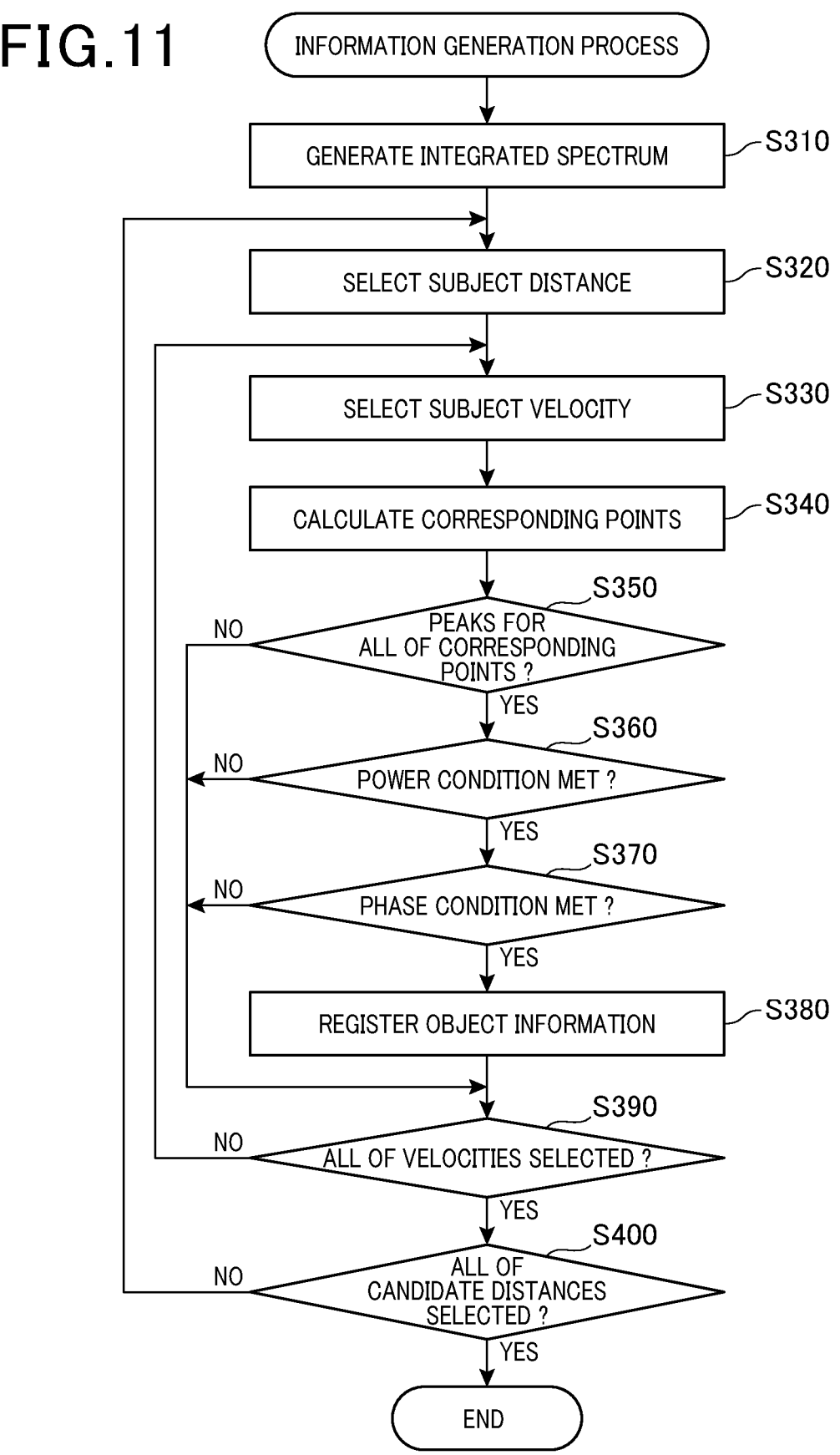
FIG. 11 is a flowchart of an information generation process.

Upon the information generation process being performed, as illustrated in FIG. 11, the processor 6, at S310, incoherently integrates the N receive spectra generated for the respective receiving antennas at S270 to calculate an integrated spectrum g (r, v). Supposing that the receive spectrum for each receiving antenna is denoted by s (r, v, Rch), the integrated spectrum g (r, v) is calculated using the following equation (1). In this equation, r is a distance, v is a normalized Doppler velocity where the velocity corresponding to the upper limit frequency of the Doppler observation range is normalized to 1, and Rch is a number for identifying the receiving antenna.

$$g(r, v) = \sum_{Rch=1}^{N} |s(r, v, Rch)|^2 \quad (1)$$

At S320, the processor 6 selects, from candidate distances, at each of which M or more peaks having an intensity equal to or higher than a preset threshold are detected on the integrated spectrum, a candidate distance that has not yet been selected as a subject distance r to be processed at steps S330 to S380 below.

At S330, the processor 6 selects, among the plurality of peaks detected at the subject distance r selected at S320, a velocity corresponding to a peak that has not yet been selected to be processed at steps S340 to S370 below, as a subject velocity v. The processor 6 selects the subject velocity in ascending order.

Assuming that the peak corresponding to the subject velocity v is a peak corresponding to the amount of phase rotation $\Delta\varphi=0°$, the processor 6, at S340, calculates M−1 corresponding points (r, vj) (where j=2 to M) at which there estimated to be peaks corresponding to other amounts of phase rotation, according to the following (2). X(j) are amounts of phase rotation other than $\Delta\varphi=0°$ selected at S220. V and vj are normalized Doppler frequencies and take a value of 0 to 1. Mod (a, m) means the remainder after dividing a by m.

$$v_j = v + \mathrm{mod}(x(j) - x(1)/P, 1) \quad (2)$$

At S350, the processor 6 determines whether there are peaks (that is, secondary local maximum points) on the integrated spectrum for all of the corresponding points estimated at S340. If the answer is "YES", the processor 6 proceeds to S360. If the answer is "NO", the processor 6 proceeds to S390. In the following, the M peaks corresponding to the corresponding points (including (r, v) as well) are referred to as a set of candidate peaks.

Upon proceeding to S360, the processor 6 determines whether the set of candidate peaks meet a power condition. If the answer is "YES", the processor 6 proceeds to S370. If the answer is "NO", the processor 6 proceeds to S390. The power condition is a condition such that differences in signal intensity between the peaks belonging to the set of candidate peaks are within a preset allowable range. This is based on the knowledge that the signal intensities of peaks based on the reflected waves from the same object should all be close to each other.

Upon proceeding to S370, the processor 6 determines whether the set of candidate peaks meet a phase condition. If the answer is "YES", the processor 6 proceeds to S380. If the answer is "NO", the processor 6 proceeds to S390. An inter-channel phase difference between the reference receiving channel and each of the other receiving channels is calculated. The phase condition is a condition such that differences in inter-channel phase difference between the peaks belonging to the set of candidate peaks are within a preset allowable range. This is based on the knowledge that the peaks based on the reflected waves from the same object should all come from the same direction, and the inter-channel phase differences between peaks coming from the same direction are close in magnitude to each other. In the following, the set of candidate peaks for which it is determined at S370 that the phase condition is met is referred to as a set of same-object peaks.

Upon proceeding to S380, the processor 6 registers the pair of subject distance r and subject velocity v as object information. Further, the processor 6 also adds an azimuth θ calculated as follows to the object information. That is, the processor 6 extracts peaks corresponding to the set of M same-object peaks from each of the N receive spectra calculated for the respective receiving antennas. The extracted M× N peaks are regarded as received signals from the M× N transmitting/receiving channels, and the azimuth θ of the object is calculated by performing an azimuth detection process, such as multiple signal classification (MUSIC) or beamforming.

Upon proceeding to S390, the processor 6 determines whether all of the peaks (that is, velocities) detected at the subject distance r have been selected as a subject velocity v. If the answer is "YES", the processor 6 proceeds to S400. If the answer is "NO", the processor 6 proceeds to S330.

Upon proceeding to S400, the processor 6 determines whether all of the candidate distances have been selected as a subject distance r. If the answer is "YES", the processor 6 ends the information generation process. If the answer is "NO", the processor 6 proceeds to S320.

Hereinafter, the relative velocities, the distances, and the azimuths calculated in the measurement process at S20 are referred to as $v_1$, $r_1$, and $\theta_1$, respectively.

As illustrated in FIG. 5, upon completion of the measurement process at S20, the processor 6, at S30, sets the repetition period Tp to the reference Tc plus a preset variable time ΔT.

Then, the processor 6 performs the measurement process at S40 in the same manner as at S20. Hereinafter, relative velocities, distances, and azimuths calculated in the measurement process at S40 are referred to as $v_2$, $r_2$, and $\theta_2$, respectively.

Upon completion of the measurement process at S40, the processor 6, at S50, sets the repetition period Tp to the reference Tc minus the preset variable time ΔT.

Then, the processor 6 performs the measurement process at S60 in the same manner as at S20. Hereinafter, relative velocities, distances, and azimuths calculated in the measurement process at S60 are referred to as $v_3$, $r_3$, and $\theta_3$, respectively.

Next, the processor 6 performs posterior distribution calculation relating to the velocity at S80.

Here, stagger modulation will now be described. The stagger modulation is a technique for randomly changing the observed velocity of the velocity-aliasing ghost by changing the repetition period Tp every measurement period Tf, and thereby making history less likely to be connected.

For example, as illustrated in FIG. 12, it is assumed that the repetition period Tp is alternately changed between the reference Tc and the reference Tc plus the variable time ΔT every measurement period Tf. In the FCM method, an observable velocity range of observed velocities $v_{obs}$ is expressed by "$-\lambda/4\ Tp < v_{obs} \leq +\lambda/4\ Tp$" where λ is a wavelength of the chirp signal.

A target whose relative velocity is out of this observable velocity range will be observed as a target having a relative velocity aliased.

Figure 13:
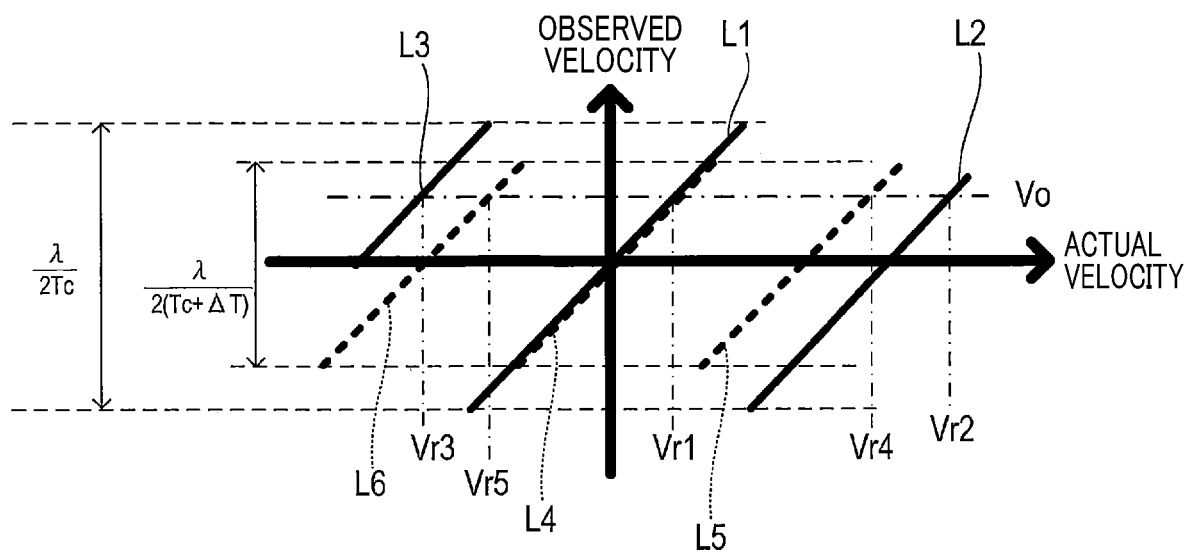
FIG. 13 is an illustration of velocity aliasing.

FIG. 13 illustrates a correspondence between the actual relative velocity and the observed velocity when the repetition period Tp is set to the reference Tc and a correspondence between the actual relative velocity and the observed velocity when the repetition period Tp is set to the reference Tc plus the variable time ΔT. The repetition period Tp set to the reference Tc is referred to as a first repetition period Tp1, and the repetition period Tp set to the reference Tc plus the variable time ΔT is referred to as a second repetition period Tp2. In FIG. 13, lines L1, L2, and L3 indicate the correspondence relating to the first repetition period Tp1, and lines L4, L5, and L6 indicate the correspondence relating to the second repetition period Tp2.

As illustrated in FIG. 13, when the observed velocity $v_{obs}$ is Vo while the repetition period Tp is the first repetition period Tp1, the actual relative velocity is assumed to be a velocity Vr1, a velocity Vr2, or a velocity Vr3, where Vo=Vr1. The velocity Vr2 corresponds to the positive once-aliased velocity. The velocity Vr3 corresponds to the negative once-aliased velocity.

When the observed velocity $V_{obs}$ is Vo while the repetition period Tp is the second repetition period Tp2, the actual relative velocity is assumed to be a velocity Vr1, a velocity Vr4, or a velocity Vr5. The velocity Vr4 corresponds to the positive once-aliased velocity. The velocity Vr5 corresponds to the negative once-aliased velocity.

Figure 14:
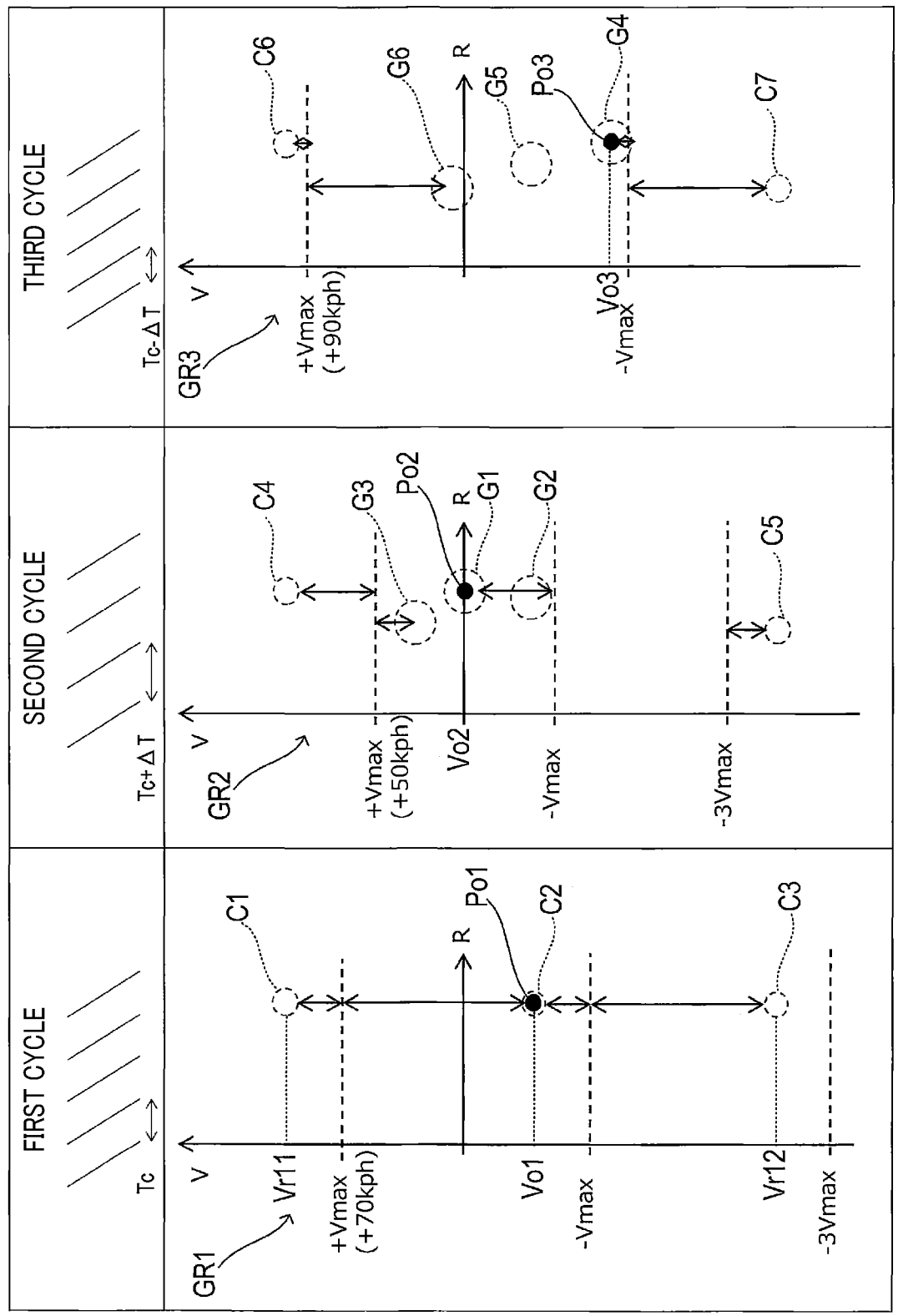
FIG. 14 is an example of an observable velocity range and velocity aliasing in each of 1st to 3rd cycles.

In the present embodiment, as illustrated in FIG. 14, the repetition period Tp is set to the reference Tc in the 1st cycle, the repetition period Tp is set to the reference Tc plus the variable time ΔT in the 2nd cycle, and the repetition period Tp is set to the reference Tc minus the variable time ΔT in the 3rd cycle.

The graphs GR1, GR2, GR3 indicate velocities and distances observed by the radar device 1, where the vertical axis is velocity and the horizontal axis is distance.

In FIG. 14, the observable velocity range in the 1st cycle is −70 km/h to +70 km/h, the observable velocity range in the 2nd cycle is −50 km/h to +50 km/h, and the observable velocity range in the 3rd cycle is −90 km/h to +90 km/h.

Assuming that the 1st-cycle observed velocity $V_{obs}$ is a velocity Vo1 as indicated by the point Po1 in the graph GR1, a first hypothesis, a second hypothesis, and a third hypothesis are set. The first hypothesis assumes that the actual relative velocity is a positive once-aliased velocity. The second hypothesis assumes that the actual relative velocity is an unaliased velocity. The third hypothesis assumes that the actual relative velocity is a negative once-aliased velocity.

More specifically, in the 1st-cycle, the first hypothesis assumes that the actual velocity is a positive once-aliased velocity Vr11, as indicated by the circle C1. The second hypothesis assumes that the actual velocity is an unaliased velocity Vo1. The third hypothesis assumes that the actual speed is a negative once-aliased velocity Vr12.

It is assumed that the 2nd-cycle observed velocity $V_{obs}$ is a velocity Vo2, as indicated by the point Po2 in the graph GR2. Prediction gates G1, G2, and G3 indicate ranges of 2nd-cycle velocities and distances predicted based on the first, second, and third hypotheses set in the 1st-cycle, respectively. The graph GR2 indicates that the 2nd-cycle observation result is included in the prediction gate G1 based on the first hypothesis. The circle C4 indicates a positive once-aliased velocity. The circle C5 indicates a negative once-aliased velocity.

It is assumed that the 3rd-cycle observed velocity $V_{obs}$ is a velocity Vo3, as indicated by the point Po3 in the graph GR3. Prediction gates G4, G5, and G6 indicate ranges of 3rd-cycle velocities and distances predicted based on the first, second, and third hypotheses set in the 1st-cycle, respectively. The graph GR3 indicates that the 3rd-cycle observation result is included in the prediction gate G4 based on the first hypothesis. The circle C6 indicates a positive once-aliased velocity. The circle C7 indicates a negative once-aliased velocity.

As above, the 2nd-cycle and 3rd-cycle observation results are included in the prediction gate G1 and the prediction gate G4 based on the first hypothesis, respectively. Therefore, the radar device 1 can determine that the actual velocity is the positive once-aliased velocity.

In this way, using the stagger modulation and setting the above first, second, and third hypotheses enable a determination as to whether the actual velocity is an unaliased velocity, a positive once-aliased velocity, or a negative once-aliased velocity.

At S80, assuming that velocity estimates of the target $\mu_{v,i}$ (i=−1, 0, +1) are known, the processor 6 estimates the velocity accuracies $\lambda_{v,i}$ (hereinafter referred to as the velocity accuracies $\lambda_{v,i}$).

$\mu_{v,0}$ is a 1st-cycle observed velocity. $U_{v,+1}$ is a positive once-aliased velocity in the 1st-cycle when the first hypothesis is adopted. $U_{v,-1}$ is a negative once-aliased velocity in the 1st-cycle when the third hypothesis is adopted.

$\lambda_{v,0}$ is the accuracy when the second hypothesis assuming no aliasing is adopted. $\lambda_{v,+1}$ is the accuracy when the first hypothesis is adopted. $\lambda_{v,-1}$ is the accuracy when the third hypothesis is adopted.

Figure 15:
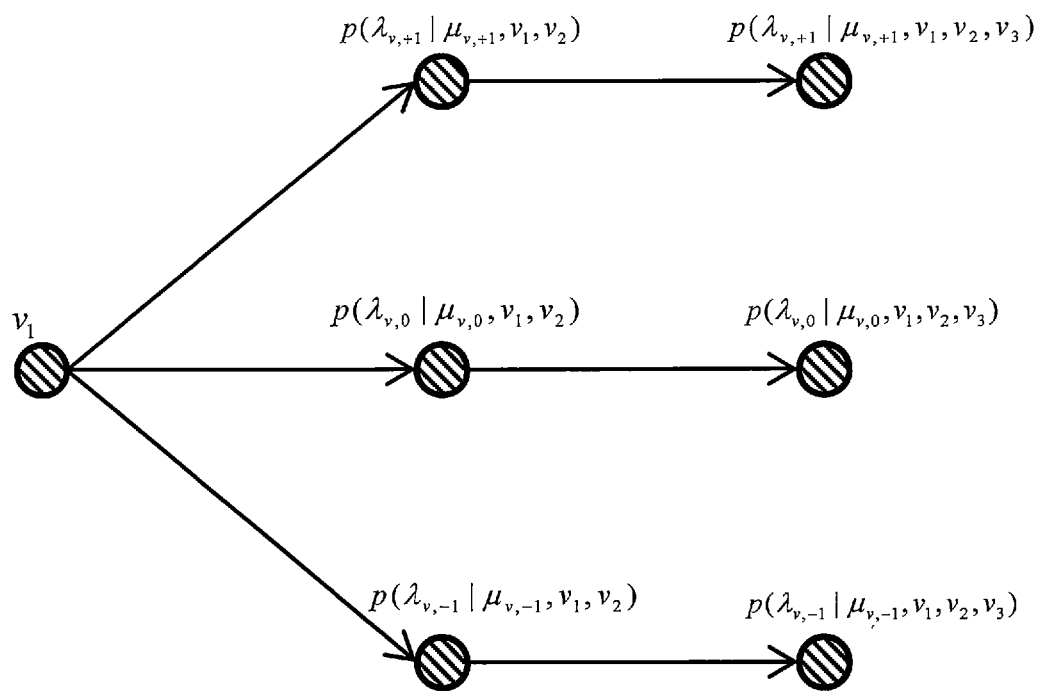
FIG. 15 is an illustration of branches of velocity accuracy distributions when first, second, and third hypotheses are adopted.

As illustrated in FIG. 15, when the observed velocity $v_1$ is acquired in the 1st-cycle and the observed velocity $v_2$ is acquired in the 2nd-cycle, an accuracy distribution of the 2nd-cycle velocity when a respective one of the first, second, and third hypotheses is adopted is calculated. Furthermore, when the observed velocity $v_3$ is acquired in the 3rd-cycle, a 3rd-cycle velocity accuracy distribution when a respective one of the first, second, and third hypotheses is adopted is calculated.

$p(\lambda_{v,+1}|\mu_{v,+1}, v_1, v_2)$ is a 2nd-cycle velocity accuracy distribution when the first hypothesis is adopted. $p(\lambda_{v,0}|\mu_{v,0}, v_1, v_2)$ is a 2nd-cycle velocity accuracy distribution when the second hypothesis is adopted. $p(\lambda_{v,-1}|\mu_{v,-1}, v_1, v_2)$ is a 2nd-cycle velocity accuracy distribution when the third hypothesis is adopted.

$p(\lambda_{v,+1}|\mu_{v,+1}, v_1, v_2, v_3)$ is a 3rd-cycle velocity accuracy distribution when the first hypothesis is adopted. $p(\lambda_{v,0}|\mu_{v,0}, v_1, v_2, v_3)$ is a 3rd-cycle velocity accuracy distribution when the second hypothesis is adopted. $p(\lambda_{v,-1}|\mu_{v,-1}, v_1, v_2, v_3)$ is a 3rd-cycle velocity accuracy distribution when the third hypothesis is adopted.

The following equation (3) is derived from Bayes' theorem. In the equation (3), $p(\lambda_{v,i}|\mu_{v,i}, v)$ are posterior distributions and $p(\lambda_{v,i}|\mu_{v,i})$ are prior distributions.

$$p(\lambda_{v,i}|\mu_{v,i},v) \propto p(v|\mu_{v,i},\lambda_{v,i})p(\lambda_{v,i}|\mu_{v,i}) \quad (3)$$

Therefore, the 3rd-cycle velocity accuracy distribution when a respective one of the first, second, and third hypotheses is adopted can be calculated according to the equation (4).

$$p(\lambda_{v,i}|\mu_{v,i},v_1,v_2,v_3) \propto p(v_3|\mu_{v,i},\lambda_{v,i})p(\lambda_{v,i}|\mu_{v,i},v_1,v_2) \propto p(v_1|\mu_{v,i},\lambda_{v,i})p(v_2|\mu_{v,i},\lambda_{v,i})p(\lambda_{v,i}|\mu_{v,i},v_1) \quad (4)$$

In the equation (4), assuming that each prior distribution $p(\lambda_{v,i}|\mu_{v,i}, v_1)$ is given by a Gamma distribution shown in the equation (5), the posterior distribution in each of the 2nd and subsequent cycles is a Gamma distribution, as shown in the equation (6). The hyperparameter $a_N$ and the hyperparameter $b_N$ in the equation (6) are calculated according to the equations (7) and (8), respectively. $v_{n,i}$ in the equation (8) is an nth-cycle i-th aliased velocity of the observed velocity.

Expected values of the velocity accuracies $\lambda_{v,i}$ are readily calculated according to the equation (9).

$$p(\lambda_{v,i} \mid u_{v,i}, v_1) = Gam(\lambda_{v,i} \mid a_1, b_1) = \frac{1}{\Gamma(a_1)} b_1^{a_1} \lambda_{v,i}^{a_1-1} e^{-b_1 \lambda_{v,i}} \quad (5)$$

$$p(\lambda_{v,i} \mid u_{v,i}, v_1, \ldots, v_N) = Gam(\lambda_{v,i} \mid a_N, b_N) \quad (6)$$

$$a_N = a_1 + \frac{N}{2} \quad (7)$$

$$b_N = b_1 + \frac{1}{2} \sum_{n=2}^{N} (v_{n,i} - \mu_{n,i})^2 \quad (8)$$

$$E[\lambda_{v,i}] = \frac{a_N}{b_N} \quad (9)$$

At S80, the processor 6 uses the relative velocities $v_1, v_2, v_3$ calculated in the measurement processes at S20, S40, S60, and calculates the expected values $E[\lambda_{v,+1}]$, $E[\lambda_{v,0}]$, $E[\lambda_{v,-1}]$ of the accuracies $\lambda_{v,+1}, \lambda_{v,0}, \lambda_{v,-1}$ according to the equations (7), (8), and (9).

Next, at S90, the processor 6 performs posterior distribution calculation relating to the distance. At S90, assuming that velocity estimates of the target $\mu_{v,i}$ (i=−1, 0, +1) are known, the processor 6 estimates the distance accuracies $\lambda_{r,i}$.

$\lambda_{r,0}$ is the distance accuracy when the second hypothesis is adopted. $\lambda_{r,+1}$ is the distance accuracy when the first hypothesis is adopted. $\lambda_{r,-1}$ is the distance accuracy when the third hypothesis is adopted.

Figure 16:
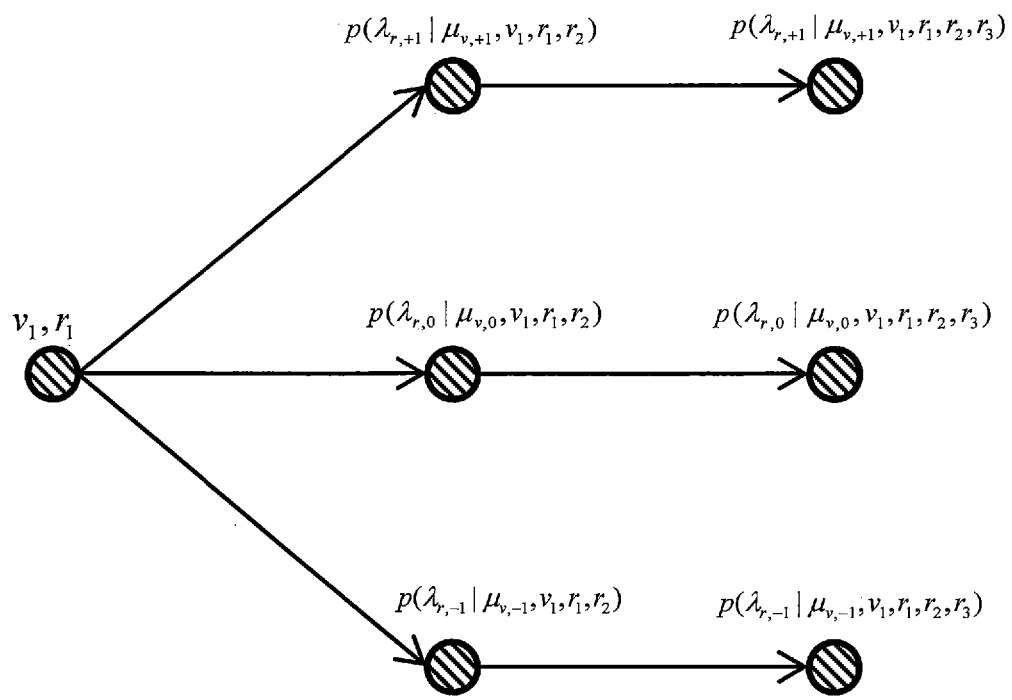
FIG. 16 is an illustration of branches of distance accuracy distributions when first, second, and third hypotheses are adopted.

As illustrated in FIG. 16, when the observed velocity $v_1$ and the observed distance $r_1$ are acquired in the 1st-cycle and the observed distance $r_2$ is acquired in the 2nd-cycle, a 2nd-cycle distance accuracy distribution when a respective one of the first, second, and third hypotheses is adopted is calculated. Furthermore, when the observed distance $r_3$ is acquired in the 3rd-cycle, a 3rd-cycle distance accuracy distribution when a respective one of the first, second, and third hypotheses is adopted is calculated. The distance rn is an n-th cycle observed distance (n=1, 2, 3).

$p(\lambda_{r,+1} \mid \mu_{v,+1}, v_1, r_1, r_2)$ is a 2nd-cycle distance accuracy distribution when the first hypothesis is adopted. $p(\lambda_{r,0} \mid \mu_{v,0}, v_1, r_1, r_2)$ is a 2nd-cycle distance accuracy distribution when the second hypothesis is adopted. $p(\lambda_{r,-1} \mid \mu_{v,-1}, v_1, r_1, r_2)$ is a 2nd-cycle distance accuracy distribution when the third hypothesis is adopted.

$p(\lambda_{r,+1} \mid \mu_{v,+1}, v_1, r_1, r_2, r_3)$ is a 3rd-cycle distance accuracy distribution when the first hypothesis is adopted. $p(\lambda_{r,0} \mid \mu_{v,0}, v_1, r_1, r_2, r_3)$ is a 3rd-cycle distance accuracy distribution when the second hypothesis is adopted. $p(\lambda_{r,-1} \mid \mu_{v,-1}, v_1, r_1, r_2, r_3)$ is a 3rd-cycle distance accuracy distribution when the third hypothesis is adopted.

Similarly to the equation (4), the 3rd-cycle distance accuracy distribution when a respective one of the first, second, and third hypotheses is adopted can be calculated according to the equation (10).

$$p(\lambda_{r,i} \mid \mu_{r,i}, v_1, r_1, r_2, r_3) \propto p(r_3 \mid \mu_{r,i}, v_1, r_1, r_2, \lambda_{r,i}) p(\lambda_{r,i} \mid \mu_{v,i}, v_1, r_1) \propto p(r_3 \mid \mu_{v,i}, v_1, r_1, r_2, \lambda_{r,i}) p(r_2 \mid \mu_{r,i}, v_1, r_1, \lambda_{r,i}) p(\lambda_{r,i} \mid \mu_{r,i}, v_1, r_1) \quad (10)$$

In the equation (10), assuming that the prior distribution $p(\lambda_{r,i} \mid \mu_{v,i}, v_1, r_1)$ is given by the Gamma distribution shown in the equation (11), the posterior distribution in each of the 2nd and subsequent cycles is a Gamma distribution, as shown in the equation (12). The hyperparameter an and the hyperparameter $b_N$ in the equation (12) are calculated according to the equations (13) and (14), respectively. T in the equation (14) is a cycle time interval. Expected values of the distance accuracies $\lambda_{r,i}$ are readily calculated according to the equation (15).

$$p(\lambda_{r,i} \mid u_{v,i}, v_1, r_1) = Gam(\lambda_{r,i} \mid a_1, b_1) = \frac{1}{\Gamma(a_1)} b_1^{a_1} \lambda_{r,i}^{a_1-1} e^{-b_1 \lambda_{r,i}} \quad (11)$$

$$p(\lambda_{r,i} \mid u_{v,i}, v_1, r_1, \ldots, r_N) = Gam(\lambda_{r,i} \mid a_N, b_N) \quad (12)$$

$$a_N = a_1 + \frac{N}{2} \quad (13)$$

$$b_N = b_1 + \frac{1}{2} \sum_{n=2}^{N} (r_n - (r_1 + (n-1)T\mu_{v,i}))^2 \quad (14)$$

$$E[\lambda_{r,i}] = \frac{a_N}{b_N} \quad (15)$$

At S90, the processor 6 uses the relative velocity $v_1$ and the distances $r_1, r_2, r_3$ calculated in the measurement processes at S20, S40, S60, and calculates the expected values $E[\lambda_{r,+1}]$, $E[\lambda_{r,0}]$, $E[\lambda_{r,-1}]$ of the accuracies $\lambda_{r,+1}, \lambda_{r,0}, \lambda_{r,-1}$ according to the equations (13), (14), (15).

Next, at S100, the processor 6 performs posterior distribution calculation relating to the azimuth. At S100, assuming that azimuth estimates $\mu_{\theta,i}$ (i=−1, 0, +1) and azimuth accuracies $\lambda_{\theta,i}$ (i=−1, 0, +1) of the target are unknown, the processor 6 simultaneously estimates both the azimuth estimates $\mu_{\theta,i}$ and the azimuth accuracies $\lambda_{\theta,i}$ (i=−1, 0, +1).

Figure 17:
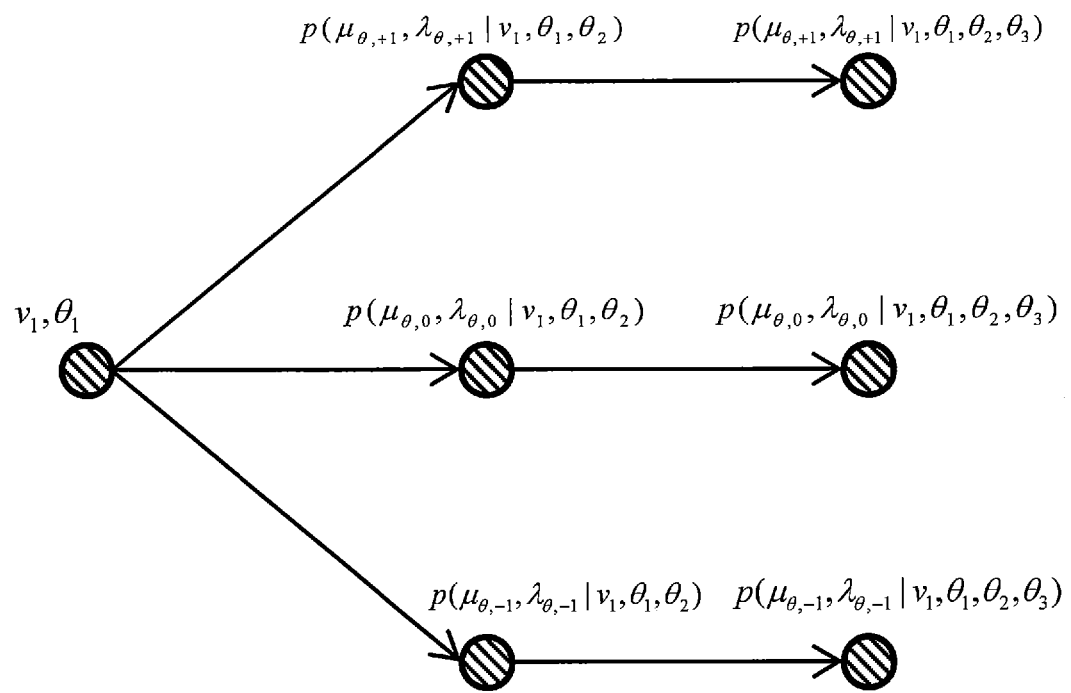
FIG. 17 is an illustration of branches of azimuth accuracy distributions when first, second, and third hypotheses are adopted.

As illustrated in FIG. 17, when the observed velocity $v_1$ and the observed azimuth $\theta_1$ are acquired in the 1st-cycle and the azimuth $\theta_2$ is acquired in the 2nd-cycle, a 2nd-cycle azimuth accuracy distribution when a respective one of the first, second, and third hypotheses is adopted is calculated. Furthermore, when the azimuth $\theta_3$ is acquired in the 3rd-cycle, a 3rd-cycle azimuth accuracy distribution when a respective one of the first, second, and third hypotheses is adopted is calculated. The azimuth θn is an n-th cycle observed azimuth (n=1, 2, 3).

$p(\mu_{\theta,+1}, \lambda_{\theta,+1} \mid v_1, \theta_1, \theta_2)$ is a 2nd-cycle azimuth accuracy distribution when the first hypothesis is adopted. $p(\mu_{\theta,0}, \lambda_{\theta,0} \mid v_1, \theta_1, \theta_2)$ is a 2nd-cycle azimuth accuracy distribution when the second hypothesis is adopted. $p(\mu_{\theta,-1}, \lambda_{\theta,-1} \mid v_1, \theta_1, \theta_2)$ is a 2nd-cycle azimuth accuracy distribution when the third hypothesis is adopted.

$p(\mu_{\theta,+1}, \lambda_{\theta,+1} \mid v_1, \theta_1, \theta_2, \theta_3)$ is a 3rd-cycle azimuth accuracy distribution when the first hypothesis is adopted. $p(\mu_{\theta,0}, \lambda_{\theta,0} \mid v_1, \theta_1, \theta_2, \theta_3)$ is a 3rd-cycle azimuth accuracy distribution when the second hypothesis is adopted. $p(\mu_{\theta,-1}, \lambda_{\theta,-1} \mid v_1, \theta_1, \theta_2, \theta_3)$ is a 3rd-cycle azimuth accuracy distribution when the third hypothesis is adopted.

The conjugate prior distribution for the 3rd-cycle azimuth accuracy distribution $p(\mu_{\theta,i}, \lambda_{\theta,i} \mid v_1, \theta_1, \theta_2, \theta_3)$ when a respective one of the first, second, and third hypotheses is adopted is the Gaussian-Gamma distribution. As shown in the equation (16), assuming that the prior distribution $p(\mu_{\theta,i}, \lambda_{\theta,i} \mid v_1, \theta_1)$ is given by the Gaussian-Gamma distribution, the posterior distribution in each of the 2nd and subsequent cycles is a Gamma distribution, as shown in the equation (17). $\mu_N, \lambda_N, a_N, b_N$ in the equation (17) are expressed by the equations (18), (19), (20), (21), respectively. Expected values of the azimuth accuracies $\lambda_{\theta,i}$ are readily calculated according to the equation (22).

$$p(\mu_{\theta,i}, \lambda_{\theta,i} \mid v_1, \theta_1) = N(\mu_{\theta,i} \mid \mu_1, (\beta_1 \lambda_{r,i})^{-1}) Gam(\lambda_{\theta,i} \mid a_1, b_1) \quad (16)$$

$$p(\mu_{\theta,i}, \lambda_{\theta,i} \mid v_1, \theta_1 \ldots, \theta_N) = N(\mu_{\theta,i} \mid \mu_N, (\beta_N \lambda_{\theta,i})^{-1}) Gam(\lambda_{\theta,i} \mid a_N, b_N) \quad (17)$$

$$\mu_N = \frac{\sum_{n=2}^{N} \theta_n + \lambda_1 \mu_1}{(N-1) + \lambda_1} \quad (18)$$

$$\lambda_N = \lambda_1 + (N-1) \quad (19)$$

$$a_N = a_1 + \frac{N-1}{2} \quad (20)$$

$$b_N = b_1 + \frac{1}{2}\left(\sum_{n=2}^{N}(\theta_n - \mu_1)^2 + \frac{\lambda_1(N-1)\left(\frac{1}{N-1}\sum_{n=2}^{N}(\theta_n - \mu_1)\right)^2}{\lambda_N}\right) \quad (21)$$

$$E[\lambda_{\theta,i}] = \frac{a_N}{b_N} \quad (22)$$

At S100, the processor 6 uses the relative velocity $v_1$ and the azimuths $\theta_1$, $\theta_2$, $\theta_3$ calculated in the measurement processes at S20, S40, S60, and calculates the expected values $E[\lambda_{\theta,+1}]$, $E[\lambda_{\theta,0}]$, $E[\lambda_{\theta,-1}]$ of the azimuth accuracies $\lambda_{\theta,+1}$, $\lambda_{\theta,0}$, $\lambda_{\theta,-1}$ according to the equations (18)-(22).

Next, at S110, the processor 6 determines the velocity of the target using the expected values calculated at S80, S90, and S100, and ends the object detection process. More specifically, the processor 6 calculates the total expected value Et1 based on the first hypothesis, the total expected value Et2 based on the second hypothesis, and the total expected value Et3 based on the third hypothesis according to the equations (23), (24), and (25), respectively. Subsequently, the processor 6 determines the velocity based on the hypothesis corresponding to the largest one of the total expected values Et1, Et2, Et3, as the velocity of the target.

$$Et1 = E[\lambda_{v,+1}] + E[\lambda_{r,+1}] + E[\lambda_{\theta,+1}] \quad (23)$$

$$Et2 = E[\lambda_{v,0}] + E[\lambda_{r,0}] + E[\lambda_{\theta,0}] \quad (24)$$

$$Et3 = E[\lambda_{v,-1}] + E[\lambda_{r,-1}] + E[\lambda_{\theta,-1}] \quad (25)$$

Simplifying and considering in the naive Bayes manner the 3rd-cycle state probability distributions $p_{i|x1, x2, x3}$ (i=+1, 0, −1) based on the first, second, and third hypotheses as shown in the equation (26), the total accuracy is expressed by the equation (27).

$$p_r = p(\lambda_{v,i} \mid \mu_{v,i}, v_1, v_2, v_3) p(\lambda_{r,i} \mid \mu_{\theta i} v_1, r_1, r_2, r_3) p(\mu_1 \theta 1, \lambda_{\theta,i} \mid v_1, \theta_1, \theta_2, \theta_3) \quad (26)$$

where the state $x_i = [r_i, v_i, \theta_i]^T$.

$$E[\lambda_{r,i}] + E[\lambda_{r,i}] + E[\lambda_{\theta,i}] \quad (27)$$

The radar device 1 configured as set forth above includes the transmitter 2, the receiver 5, and the processor 6.

Each time the preset measurement period Tf elapses, the transmitter 2 repeatedly transmits a radar wave whose frequency changes with time, every preset repetition period Tp for the preset number K of repetitions.

The processor 6 changes the repetition period Tp each time the measurement period Tf elapses.

The receiver 5 and the processor 6 receive reflected radar waves from an object and thereby detect at least a relative velocity of the object (hereinafter referred to as a reflecting object) as an observed velocity.

The processor 6 selects one of the first hypothesis, the second hypothesis, and the third hypothesis, based on $p(\lambda_{v,i} \mid \mu_{v,i}, v_1, v_2, v_3)$ calculated for each of the first hypothesis, the second hypothesis, and the third hypothesis from $p(\lambda_{v,i} \mid \mu_{v,i}, v_1)$ and a detection result of observed velocities for three cycles.

With this configuration, the radar device 1 is able to select the hypothesis corresponding to the posterior distribution having the highest velocity accuracy $\lambda_{v,i}$ among $p(\lambda_{v,+1} \mid \mu_{v,+1}, v_1, v_2, v_3)$, $p(\lambda_{v,0} \mid \mu_{v,0}, v_1, v_2, v_3)$, and $p(\lambda_{v,-1} \mid \mu_{v,-1}, v_1, v_2, v_3)$. This allows the radar device 1 to suppress occurrence of a situation in which the posterior distributions corresponding to at least two of the first hypothesis, the second hypothesis, and the third hypothesis simultaneously have the highest velocity accuracy $\lambda_{v,i}$. Therefore, the radar device 1 is able to suppress occurrence of a situation in which it is impossible to determine which hypothesis is correct among the first hypothesis, the second hypothesis, and the third hypothesis, and thereby improve the detection accuracy of the velocity of the object.

The processor 6 further detects the distance to the reflecting object as an observed distance. The processor 6 selects one of the first hypothesis, the second hypothesis, and the third hypothesis, based not only on $p(\lambda_{v,i} \mid \mu_{v,i}, v_1, v_2, v_3)$ but also on $p(\lambda_{r,i} \mid \mu_{v,i}, v_1, r_1, r_2, r_3)$ calculated for each of the first hypothesis, the second hypothesis, and the third hypothesis from at least $p(\lambda_{r,i} \mid \mu_{v,i}, v_1, r_1)$ and a detection result of observed distances for three cycles.

With this configuration, the radar device 1 is able to select the hypothesis using the distance accuracies $\lambda_{r,i}$, in addition to the velocity accuracies $\lambda_{v,i}$. Therefore, the radar device 1 is able to more suppress occurrence of a situation in which it is impossible to determine which hypothesis is correct among the first hypothesis, the second hypothesis, and the third hypothesis, and thereby more improve the detection accuracy of the velocity of the object.

The processor 6 further detects the azimuth of the reflecting object as an observed azimuth. The processor 6 selects one of the first hypothesis, the second hypothesis, and the third hypothesis, based not only on $p(\lambda_{v,i} \mid \mu_{v,i}, v_1, v_2, v_3)$ but also on $p(\mu_{\theta,i}, \lambda_{\theta,i} \mid v_1, \theta_1, \theta_2, \theta_3)$ calculated for each of the first hypothesis, the second hypothesis, and the third hypothesis from at least $p(\mu_{\theta,i}, \lambda_{\theta,i} \mid v_1, \theta_1)$ and a detection result of observed azimuths for three cycles.

With this configuration, the radar device 1 is able to select the hypothesis using the azimuth accuracies $\lambda_{\theta,i}$, in addition to the velocity accuracies $\lambda_{v,i}$. Therefore, the radar device 1 is able to more suppress occurrence of a situation in which it is impossible to determine which hypothesis is correct among the first hypothesis, the second hypothesis, and the third hypothesis, and thereby more improve the detection accuracy of the velocity of the object.

$p(\lambda_{v,i} \mid \mu_{v,i}, v_1)$ and $p(\lambda_{r,i} \mid \mu_{v,i}, v_1, r_1)$ (i=+1, 0, −1) are Gamma distributions. This configuration allows the radar device 1 to reduce an amount of calculation for calculating $p(\lambda_{v,i} \mid \mu_{v,i}, v_1, v_2, v_3)$ and $p(\lambda_{r,i} \mid \mu_{v,i}, v_1, r_1, r_2, r_3)$.

$p(\mu_{\theta,i}, \lambda_{\theta,i} \mid v_1, \theta_1)$ (i=+1, 0, −) are Gaussian-Gamma distributions. This configuration allows the radar device 1 to reduce an amount of calculation for calculating $p(\mu_{\theta,i}, \lambda_{\theta,i} \mid v_1, \theta_1, \theta_2, \theta_3)$.

In the embodiment set forth above, the chirp signals correspond to the radar waves, S10, S30, and S50 correspond to a process performed by the repetition period setter, S20, S40, and S60 correspond to a process performed by the object detector, and S80 to S110 correspond to a process performed by the hypothesis selector.

$p(\lambda_{v,i} \mid \mu_{v,i}, v_1)$ (i=+1, 0, −1) correspond to the velocity accuracy prior distributions, the 3 cycles correspond to the number of distribution calculations, and $p(\lambda_{v,i} \mid \mu_{v,i}, v_1, v_2, v_3)$ (i=+1, 0, −1) correspond to the velocity accuracy posterior distributions.

$p(\lambda_{r,i}|\mu_{v,i}, v_1, r_1)$ (i=+1, 0, −1) correspond to the distance accuracy prior distributions, and $p(\lambda_{r,i}|\mu_{v,i}, v_1, r_1, r_2, r_3)$ (i=+1, 0, −1) correspond to the distance accuracy posterior distributions.

$p(\mu_{\theta,i}, \lambda_{\theta,i}|v_1, \theta_1)$ (i=+1, 0, −1) correspond to the azimuth accuracy priority distributions, and $p(\mu_{\theta,i}, \lambda_{\theta,i}|v_1, \theta_1, \theta_2, \theta_3)$ (i=+1, 0, −1) correspond to the azimuth accuracy posterior distributions.

As above, while the one embodiment of the present disclosure has been described above, the present disclosure is not limited to the above-described embodiment, and may be implemented with various modifications.

Modifications

In the specific embodiment set forth above, the posterior distribution calculations relating to the velocity, the distance, and the azimuth have been described. But the present disclosure is not limited to the specific embodiment set forth above. In some modifications, only the posterior distribution calculations relating to the velocity, only the posterior distribution calculations relating to the velocity and the distance, or only the posterior distribution calculations relating to the velocity and the azimuth may be performed.

The functions of a single component may be distributed to a plurality of components, or the functions of a plurality of components may be consolidated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments.

Besides the radar device 1 described above, the present disclosure can be implemented in various modes such as a system including the radar device 1 as a constituent element, a program for causing a computer to serve as the radar device 1, a storage medium storing this program, a velocity detection method, and others.

What is claimed is:

1. A radar device comprising:
   a transmitter configured to, each time a preset measurement period corresponding to one cycle elapses, repeatedly transmit a radar wave whose frequency changes with time, every preset repetition period for a preset number of repetitions;
   non-transitory memory storing one or more computer programs; and
   a processor configured to execute the one or more computer programs to:
      change the repetition period each time the measurement period elapses;
      based on the radar wave reflected from an object that is received by a receiver, detect, as an observed velocity, a relative velocity of a reflecting object which is the object that reflected the radar wave;
      calculate velocity-accuracy posterior distributions for each of a first hypothesis, a second hypothesis, and a third hypothesis, the velocity-accuracy posterior distributions comprising posterior distributions relating to accuracies of the relative velocity after a preset number of distribution calculations for a same number of consecutive cycles, wherein the velocity-accuracy posterior distributions are calculated from (i) velocity-accuracy prior distributions that are prior distributions relating to accuracies of the relative velocity, and (ii) a detection result of the observed velocities for the preset number of distribution calculations,
      the first hypothesis assuming that the observed velocity is an aliased relative velocity when the relative velocity is higher than an upper limit of an observable velocity range set based on the repetition period,
      the second hypothesis assuming that the observed velocity is an unaliased relative velocity, and
      the third hypothesis assuming that the observed velocity is an aliased relative velocity when the relative velocity is below a lower limit of the observable velocity range;
      select one of the first hypothesis, the second hypothesis, and the third hypothesis based on the respective hypothesis that has a highest velocity accuracy among the velocity-accuracy posterior distributions for the first hypothesis, the second hypothesis, and the third hypothesis; and
      determine a velocity of the object based on the selected one of the first hypothesis, the second hypothesis, and the third hypothesis.

2. The radar device according to claim 1, wherein
   the processor is further configured to execute the one or more computer programs to
      detect a distance to the reflecting object as an observed distance, in addition to the observed velocity, and select one of the first hypothesis, the second hypothesis, and the third hypothesis, based on distance-accuracy posterior distributions that are posterior distributions relating to accuracies of the distance to the reflecting object after the preset number of distribution calculations, one for each cycle, in addition to the velocity-accuracy posterior distributions, the distance-accuracy posterior distributions being respectively calculated for the first hypothesis, the second hypothesis, and the third hypothesis from distance-accuracy prior distributions that are prior distributions relating to accuracies of the distance to the reflecting object, and a detection result of the observed distances for the preset number of distribution calculations.

3. The radar device according to claim 2, wherein
   the processor is further configured to execute the one or more computer programs to
      detect an azimuth of the reflecting object as an observed azimuth, in addition to the observed velocity and the observed distance, and select one of the first hypothesis, the second hypothesis, and the third hypothesis, based on azimuth-accuracy posterior distributions that are posterior distributions relating to accuracies of the azimuth of the reflecting object after the preset number of distribution calculations, one for each cycle, in addition to the velocity-accuracy posterior distributions and the distance-accuracy posterior distributions, the azimuth-accuracy posterior distributions being respectively calculated for the first hypothesis, the second hypothesis, and the third hypothesis from azimuth-accuracy prior distributions that are prior distributions relating to accuracies of the azimuth, and a detection result of the observed azimuths for the preset number of distribution calculations.

4. The radar device according to claim 2, wherein
   the distance-accuracy prior distributions are Gamma distributions.

5. The radar device according to claim 1, wherein
the processor is further configured to execute the one or more computer programs to
detect an azimuth of the reflecting object as an observed azimuth, in addition to the observed velocity, and select one of the first hypothesis, the second hypothesis, and the third hypothesis, based on azimuth-accuracy posterior distributions that are posterior distributions relating to accuracies of the azimuth of the reflecting object after the preset number of distribution calculations, one for each cycle, in addition to the velocity-accuracy posterior distributions, the azimuth-accuracy posterior distributions being respectively calculated for the first hypothesis, the second hypothesis, and the third hypothesis from azimuth-accuracy prior distributions that are prior distributions relating to accuracies of the azimuth, and a detection result of the observed azimuths for the preset number of distribution calculations.

6. The radar device according to claim 3, wherein
the azimuth-accuracy prior distribution are Gaussian-Gamma distributions.

7. The radar device according to claim 1, wherein
the velocity-accuracy prior distributions are Gamma distributions.

8. A method for determining a velocity of an object that reflects a radar wave, the method comprising:
repeatedly transmit a radar wave whose frequency changes with time, each time a preset measurement period corresponding to one cycle elapses and every preset repetition period for a preset number of repetitions;
change the repetition period each time the measurement period elapses;
detect, as an observed velocity, a relative velocity of a reflecting object, the reflecting object comprising the object that reflected the radar wave, the relative velocity detected based on the radar wave reflected from the object that is received by a receiver;
calculate velocity-accuracy posterior distributions for each of a first hypothesis, a second hypothesis, and a third hypothesis, the velocity-accuracy posterior distributions comprising posterior distributions relating to accuracies of the relative velocity after a preset number of distribution calculations for a same number of consecutive cycles, wherein the velocity-accuracy posterior distributions are calculated from (i) velocity-accuracy prior distributions that are prior distributions relating to accuracies of the relative velocity, and (ii) a detection result of the observed velocities for the preset number of distribution calculations,
the first hypothesis assuming that the observed velocity is an aliased relative velocity when the relative velocity is higher than an upper limit of an observable velocity range set based on the repetition period,
the second hypothesis assuming that the observed velocity is an unaliased relative velocity, and
the third hypothesis assuming that the observed velocity is an aliased relative velocity when the relative velocity is below a lower limit of the observable velocity range; and
select one of the first hypothesis, the second hypothesis, and the third hypothesis based on the respective hypothesis that has a highest velocity accuracy among the velocity-accuracy posterior distributions for the first hypothesis, the second hypothesis, and the third hypothesis; and
determine the velocity of the object that reflected the radar wave based on the selected one of the first hypothesis, the second hypothesis, and the third hypothesis.

9. The method according to claim 8, further comprising
detecting a distance to the reflecting object as an observed distance, in addition to the observed velocity, and selecting one of the first hypothesis, the second hypothesis, and the third hypothesis, based on distance-accuracy posterior distributions that are posterior distributions relating to accuracies of the distance to the reflecting object after the preset number of distribution calculations, one for each cycle, in addition to the velocity-accuracy posterior distributions, the distance-accuracy posterior distributions being respectively calculated for the first hypothesis, the second hypothesis, and the third hypothesis from distance-accuracy prior distributions that are prior distributions relating to accuracies of the distance to the reflecting object, and a detection result of the observed distances for the preset number of distribution calculations.

10. The method according to claim 9, further comprising
detecting an azimuth of the reflecting object as an observed azimuth, in addition to the observed velocity and the observed distance, and selecting one of the first hypothesis, the second hypothesis, and the third hypothesis, based on azimuth-accuracy posterior distributions that are posterior distributions relating to accuracies of the azimuth of the reflecting object after the preset number of distribution calculations, one for each cycle, in addition to the velocity-accuracy posterior distributions and the distance-accuracy posterior distributions, the azimuth-accuracy posterior distributions being respectively calculated for the first hypothesis, the second hypothesis, and the third hypothesis from azimuth-accuracy prior distributions that are prior distributions relating to accuracies of the azimuth, and a detection result of the observed azimuths for the preset number of distribution calculations.

11. The method according to claim 9, further comprising
the distance-accuracy prior distributions are Gamma distributions.

12. The method according to claim 8, further comprising
detecting an azimuth of the reflecting object as an observed azimuth, in addition to the observed velocity, and selecting one of the first hypothesis, the second hypothesis, and the third hypothesis, based on azimuth-accuracy posterior distributions that are posterior distributions relating to accuracies of the azimuth of the reflecting object after the preset number of distribution calculations, one for each cycle, in addition to the velocity-accuracy posterior distributions, the azimuth-accuracy posterior distributions being respectively calculated for the first hypothesis, the second hypothesis, and the third hypothesis from azimuth-accuracy prior distributions that are prior distributions relating to accuracies of the azimuth, and a detection result of the observed azimuths for the preset number of distribution calculations.

13. The method according to claim 12, further comprising
the azimuth-accuracy prior distribution are Gaussian-Gamma distributions.

14. The method according to claim 8, further comprising
the velocity-accuracy prior distributions are Gamma distributions.

15. A radar device comprising:
a transmitter configured to, each time a preset measurement period corresponding to one cycle elapses, repeatedly transmit a radar wave whose frequency changes with time, every preset repetition period for a preset number of repetitions; and a circuit configured to:
change the repetition period each time the measurement period elapses;
based on the radar wave reflected from an object that is received by a receiver, detect, as an observed velocity, a relative velocity of a reflecting object which is the object that reflected the radar wave;
calculate velocity-accuracy posterior distributions for each of a first hypothesis, a second hypothesis, and a third hypothesis, the velocity-accuracy posterior distributions comprising posterior distributions relating to accuracies of the relative velocity after a preset number of distribution calculations for a same number of consecutive cycles, wherein the velocity-accuracy posterior distributions are calculated from (i) velocity-accuracy prior distributions that are prior distributions relating to accuracies of the relative velocity, and (ii) a detection result of the observed velocities for the preset number of distribution calculations,
the first hypothesis assuming that the observed velocity is an aliased relative velocity when the relative velocity is higher than an upper limit of an observable velocity range set based on the repetition period,
the second hypothesis assuming that the observed velocity is an unaliased relative velocity, and
the third hypothesis assuming that the observed velocity is an aliased relative velocity when the relative velocity is below a lower limit of the observable velocity range;
select one of the first hypothesis, the second hypothesis, and the third hypothesis based on the respective hypothesis that has a highest velocity accuracy among the velocity-accuracy posterior distributions for the first hypothesis, the second hypothesis, and the third hypothesis; and
determine a velocity of the object based on the selected one of the first hypothesis, the second hypothesis, and the third hypothesis.

16. The radar device according to claim 15, wherein the circuit is further configured to
detect a distance to the reflecting object as an observed distance, in addition to the observed velocity, and select one of the first hypothesis, the second hypothesis, and the third hypothesis, based on distance-accuracy posterior distributions that are posterior distributions relating to accuracies of the distance to the reflecting object after the preset number of distribution calculations, one for each cycle, in addition to the velocity-accuracy posterior distributions, the distance-accuracy posterior distributions being respectively calculated for the first hypothesis, the second hypothesis, and the third hypothesis from distance-accuracy prior distributions that are prior distributions relating to accuracies of the distance to the reflecting object, and a detection result of the observed distances for the preset number of distribution calculations.

17. The radar device according to claim 16, wherein the circuit is further configured to
detect an azimuth of the reflecting object as an observed azimuth, in addition to the observed velocity and the observed distance, and select one of the first hypothesis, the second hypothesis, and the third hypothesis, based on azimuth-accuracy posterior distributions that are posterior distributions relating to accuracies of the azimuth of the reflecting object after the preset number of distribution calculations, one for each cycle, in addition to the velocity-accuracy posterior distributions and the distance-accuracy posterior distributions, the azimuth-accuracy posterior distributions being respectively calculated for the first hypothesis, the second hypothesis, and the third hypothesis from azimuth-accuracy prior distributions that are prior distributions relating to accuracies of the azimuth, and a detection result of the observed azimuths for the preset number of distribution calculations.

18. The radar device according to claim 16, wherein the distance-accuracy prior distributions are Gamma distributions.

19. The radar device according to claim 15, wherein the circuit is further configured to
detect an azimuth of the reflecting object as an observed azimuth, in addition to the observed velocity, and select one of the first hypothesis, the second hypothesis, and the third hypothesis, based on azimuth-accuracy posterior distributions that are posterior distributions relating to accuracies of the azimuth of the reflecting object after the preset number of distribution calculations, one for each cycle, in addition to the velocity-accuracy posterior distributions, the azimuth-accuracy posterior distributions being respectively calculated for the first hypothesis, the second hypothesis, and the third hypothesis from azimuth-accuracy prior distributions that are prior distributions relating to accuracies of the azimuth, and a detection result of the observed azimuths for the preset number of distribution calculations.

20. The radar device according to claim 15, wherein the velocity-accuracy prior distributions are Gamma distributions.

* * * * *